US009447774B2

(12) United States Patent
Olsen et al.

(10) Patent No.: US 9,447,774 B2
(45) Date of Patent: *Sep. 20, 2016

(54) NON-ROTATING WIND ENERGY GENERATOR

(71) Applicant: Northeastern University, Boston, MA (US)

(72) Inventors: Thomas Olsen, Millis, MA (US); Dylan Thorp, Melrose, MA (US); Liam Byers, Lunenburg, MA (US); Mitchell Noah, Randolph, NJ (US); Evan Weiner, Windham, NH (US); Mohammad Taslim, Needham, MA (US)

(73) Assignee: Northeastern University, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/951,067

(22) Filed: Nov. 24, 2015

(65) Prior Publication Data

US 2016/0076521 A1     Mar. 17, 2016

Related U.S. Application Data

(63) Continuation of application No. 14/054,820, filed on Oct. 15, 2013, now Pat. No. 9,222,465, which is a continuation-in-part of application No. PCT/US2012/033754, filed on Apr. 16, 2012.

(60) Provisional application No. 61/863,900, filed on Aug. 8, 2013, provisional application No. 61/476,103, filed on Apr. 15, 2011.

(51) Int. Cl.
*F03D 9/00* (2016.01)
*H02P 9/04* (2006.01)

(Continued)

(52) U.S. Cl.
CPC ............... *F03D 9/002* (2013.01); *F03D 5/00* (2013.01); *H02K 7/1876* (2013.01); *Y02E 10/70* (2013.01); *Y02E 10/725* (2013.01)

(58) Field of Classification Search
USPC .................................................. 290/44, 55
See application file for complete search history.

(56) References Cited

U.S. PATENT DOCUMENTS 1,486,040 A    3/1924  Schieferstein
3,995,972 A   12/1976  Nassar (Continued)

FOREIGN PATENT DOCUMENTS

WO    WO-2007071975 A1    6/2007
WO    WO-2011015120 A1    2/2011
WO    WO-2012142563 A1   10/2012

OTHER PUBLICATIONS

Alonso, G., et al., "On the Galloping Instability of Two-dimensional Bodies Having Elliptical Cross-sections," Journal of Wind Engineering and Industrial Aerodynamics, vol. 98.8, pp. 438-448, 11 pages (2010).

(Continued)

*Primary Examiner* — Pedro J Cuevas
(74) *Attorney, Agent, or Firm* — Wilmer Cutler Pickering Hale and Dorr LLP

(57) ABSTRACT

In an embodiment of the invention, a non-rotating wind energy generator uses the fluid flow principles of vortex shedding and transverse galloping to generate oscillatory motion of a beam, and alternators, optionally located near both ends of the beam, generate electrical power when the beam is in motion.

29 Claims, 40 Drawing Sheets

(51) Int. Cl.
*F03D 5/00* (2006.01)
*H02K 7/18* (2006.01)

(56) References Cited

U.S. PATENT DOCUMENTS

| | | | |
|---|---|---|---|
| 4,184,805 A | 1/1980 | Arnold | |
| 4,347,036 A | 8/1982 | Arnold | |
| 4,387,318 A | 6/1983 | Kolm et al. | |
| 4,396,852 A | 8/1983 | Hunt | |
| 4,536,674 A | 8/1985 | Schmidt | |
| 4,627,294 A | 12/1986 | Lew | |
| 5,223,763 A | 6/1993 | Chang | |
| 5,801,475 A | 9/1998 | Kimura | |
| 6,011,346 A | 1/2000 | Buchanan et al. | |
| 6,351,999 B1 | 3/2002 | Maul et al. | |
| 6,424,079 B1 | 7/2002 | Carroll | |
| 6,958,553 B2 | 10/2005 | Ichii et al. | |
| 7,012,340 B2 | 3/2006 | Yi | |
| 7,148,591 B2 | 12/2006 | Mizoguchi et al. | |
| 7,199,480 B2 | 4/2007 | Fripp et al. | |
| 7,208,845 B2 | 4/2007 | Masters et al. | |
| 7,224,077 B2 | 5/2007 | Allen | |
| 7,439,657 B2 | 10/2008 | Clingman et al. | |
| 7,498,681 B1 | 3/2009 | Kellogg et al. | |
| 7,504,764 B2 | 3/2009 | Chang et al. | |
| 7,525,205 B2 | 4/2009 | Mabuchi et al. | |
| 7,560,856 B2 | 7/2009 | Chen et al. | |
| 7,573,143 B2 | 8/2009 | Frayne | |
| 7,626,281 B2 | 12/2009 | Kawai | |
| 7,633,175 B1 | 12/2009 | Wilson, III et al. | |
| 7,772,712 B2 | 8/2010 | Frayne | |
| 7,821,144 B2 * | 10/2010 | Frayne | F03B 17/06 290/1 R |
| 7,847,421 B2 | 12/2010 | Gardner et al. | |
| 7,884,490 B1 | 2/2011 | Wilson, III et al. | |
| 7,906,861 B2 | 3/2011 | Guerrero et al. | |
| 7,986,051 B2 | 7/2011 | Frayne | |
| 8,026,619 B2 * | 9/2011 | Frayne | F03B 17/06 290/1 R |
| 8,102,072 B2 | 1/2012 | Tsou | |
| 8,142,154 B2 | 3/2012 | Gartner | |
| 8,258,644 B2 | 9/2012 | Kaplan | |
| 8,272,839 B2 | 9/2012 | Gartner | |
| 8,278,776 B1 * | 10/2012 | Arntz | F03D 5/00 290/54 |
| 8,432,049 B2 | 4/2013 | Jung | |
| 8,519,554 B2 | 8/2013 | Kaplan | |
| 8,882,998 B2 | 11/2014 | Tranzeat et al. | |
| 9,222,465 B2 | 12/2015 | Thorp et al. | |
| 2006/0064972 A1 | 3/2006 | Allen | |
| 2006/0071578 A1 | 4/2006 | Drabe et al. | |
| 2007/0052143 A1 | 3/2007 | Emoto et al. | |
| 2008/0036307 A1 | 2/2008 | Lu et al. | |
| 2008/0048455 A1 | 2/2008 | Carney | |
| 2008/0129254 A1 | 6/2008 | Frayne | |
| 2008/0277941 A1 | 11/2008 | Bowles et al. | |
| 2008/0297119 A1 | 12/2008 | Frayne | |
| 2009/0295163 A1 | 12/2009 | Frayne | |
| 2009/0309362 A1 | 12/2009 | Frayne | |
| 2009/0317250 A1 | 12/2009 | Gamble et al. | |
| 2010/0207395 A1 | 8/2010 | Frayne | |
| 2010/0276937 A1 | 11/2010 | Clynes | |
| 2010/0276939 A1 | 11/2010 | Clynes | |
| 2011/0084489 A1 | 4/2011 | Kaplan | |
| 2011/0290908 A1 | 12/2011 | Tranzeat et al. | |
| 2012/0235417 A1 * | 9/2012 | Arntz | F03D 5/00 290/55 |
| 2013/0020806 A1 * | 1/2013 | Hsu | F03G 7/08 290/54 |
| 2013/0076036 A1 * | 3/2013 | Liu | F03D 7/00 290/44 |
| 2013/0214532 A1 * | 8/2013 | Hsu | F03B 17/06 290/43 |
| 2014/0097621 A1 | 4/2014 | Kassianoff | |
| 2015/0069683 A1 * | 3/2015 | Hochberg | F03G 7/08 267/140.11 |
| 2015/0285223 A1 * | 10/2015 | Sanchez | F03D 9/02 290/50 |

OTHER PUBLICATIONS

Den Hartog, J. P., "59. Galloping of Electric Transmission Lines," Mechanical Vibration, McGraw-Hill, New York, 1st edition, 11 pages (1934).

International Search Report and Written Opinion issued by the U.S. Patent and Trademark Office as International Searching Authority for International Application No. PCT/US2012/33754 mailed Jul. 23, 2012 (8 pgs.).

International Search Report and Written Opinion issued by the U.S. Patent and Trademark Office as International Searching Authority for International Application No. PCT/US2014/49317 mailed Nov. 12, 2014 (16 pgs.).

Supplementary European Search Report issued by the European Patent Office for European Patent Application No. 12771594.4 dated Jul. 30, 2014 (5 pgs.).

Office Action issued by the Japanese Patent Office for Japanese Patent Application No. 2014-505393 mailed Feb. 29, 2016 (11 total pgs.).

* cited by examiner

NON-ROTATING WIND ENERGY GENERATOR

RELATED APPLICATIONS

This application is a continuation of U.S. application Ser. No. 14/054,820, filed on Oct. 15, 2013 entitled "Non-Rotating Wind Energy Generator," which is herein incorporated by reference in its entirety. U.S. application Ser. No. 14/054,820 claims priority to U.S. Provisional Patent Application No. 61/863,900, filed on Aug. 8, 2013 entitled "Novel Magnet And Coil Inductor Configurations For A Non-Rotating Wind Energy Generator," which is herein incorporated by reference in its entirety. Additionally, U.S. application Ser. No. 14/054,820 claims the benefit of priority to and is a continuation-in-part of PCT/US12/33754, filed Apr. 16, 2012, which claims priority to U.S. Provisional Patent Application No. 61/476,103, filed Apr. 15, 2011 entitled "Non-Rotating Wind Energy Generator," which are herein incorporated by reference in their entirety.

FIELD

This invention relates to generating electrical power from wind.

BACKGROUND

The ever-increasing demand for sustainable, environmentally-friendly power generation from wind is currently met with devices such as the wind turbine. Although wind turbines are the most commonly used method of generating electrical power from wind, they have several inherent drawbacks. These devices are costly, difficult to construct, install, and maintain, highly visible, noisy, large, susceptible to damage, and relatively difficult to transport and assemble. Their tall stature makes them susceptible to damage from flying debris, birds, and even low flying planes. The U.S. Military has also voiced concerns claiming the placement of wind turbines in a radar system's line of sight may adversely impact the unit's ability to detect threats. Rotating wind turbines are also not suitable for military applications that require quiet, inconspicuous power generation in remote locations. Additionally, when facing high wind speeds, a mechanical brake must be applied, creating losses and inefficiencies. Therefore, there is a need for portable, non-rotating devices that can generate useful amounts of electrical power in a quiet, inconspicuous manner.

A system created by Vortex Hydro Energy uses the principle of vortex-induced vibration in water to harness wave energy. The company has developed a device called the Vortex Induced Vibration Aquatic Clean Energy (VIVACE). This product uses vortex-induced vibration as a primary means of creating mechanical motion from fluid flow. The system is designed to operate underwater in ocean currents. This system uses an electrically variable spring constant system that dynamically changes the natural frequency to allow for optimization at different flow speeds. This system is unsatisfactory for wind power generation due to the large difference between the fluid flow properties of air. The frequency of vortex shedding in air is much faster that the shedding frequency in water. Therefore, matching the system's natural frequency with the shedding frequency would result in an extremely large spring constant. A spring this size would require a great deal of force to move. The lift characteristics of this application do not provide enough lift to overcome this spring constant, and no vibrations will occur.

Therefore, a need exists for portable, non-rotating devices that can generate useful amounts of electrical power from wind in a quiet, inconspicuous manner.

SUMMARY

Aspects of this invention relate to a novel approach to harnessing wind power. In an embodiment of the invention, the device uses the fluid flow principle of vortex shedding and self-excited oscillations, which can result from transverse galloping phenomena to generate oscillatory, linear motion of a beam. In an embodiment of the invention, linear magnetic inductors, also referred to as linear alternators, optionally located near both ends of the beam generate electrical power when the beam is in motion.

In an aspect of the invention, a non-rotating wind energy generating apparatus comprises a suspended bluff body operable to initiate and sustain oscillatory motion in response to wind energy and an inductor system, also referred to as a linear alternator system, operable to generate electrical energy via the motion of the suspended bluff body. In a further aspect of the invention, a non-rotating wind energy generating apparatus comprises a suspended bluff body operable to initiate and sustain oscillatory motion in response to wind energy, using self-excited oscillation caused by vortex shedding, transverse galloping, or some combination thereof, and an inductor system, also referred to as a linear alternator system, operable to generate electrical energy via the motion of the suspended bluff body. In one or more embodiments, the suspended bluff body may comprise a frame movably supporting at least one beam, one or more first springs, one or more second springs, wherein the one or more first springs attach a first portion of the frame to a first portion of the beam and the one or more second springs attach a second portion of the frame to a second portion of the beam such that the beam is suspended between the first and second portions of the frame, and wherein the linear alternator system comprises at least one inductor, also referred to as an electromagnetic coil, attached to one of the beam or a third portion of the frame, at least one magnet attached to one of the third portion of the frame or the beam, wherein motion of the beam when exposed to wind causes the first inductor to pass the at least one magnet. In any of the proceeding embodiments, the beam may have a D-shape. In any of the proceeding embodiments, the beam may be hollow. Any of the proceeding embodiments may further comprise one or more guide rails, also referred to as motion guides. Any of the proceeding embodiments may further comprise one or more additional beams, one or more additional upper springs, one or more additional lower springs, wherein the one or more additional upper springs attach a first portion of the additional beam to a third portion of the beam and the one or more additional lower springs attach a second portion of the additional beam to a fourth portion of the beam such that the one or more additional beams are suspended between the first and second portions of the frame. In any of the proceeding embodiments, the first portion of the frame may be an upper portion, the first portion of the beam may be an upper portion, the second portion of the frame may be a lower portion, and the second portion of the beam may be a lower portion. In any of the proceeding embodiments, the third portion of the frame may be a side portion. In any of the proceeding embodiments, the beam may be suspended substantially horizontally. In any of the proceeding embodiments, the motion of the beam may be substantially vertical. In any of the proceeding embodiments, a surface of the beam may be uniformly smooth. In any of the proceeding embodiments, a surface of the beam may be partially smooth. In any of the proceeding embodiments, a surface of the beam may be uniformly rough. In any of the proceeding embodiments, a surface of the beam may be partially rough. In any of the proceeding embodiments, the at least one electromagnetic coil or the at least one magnet may be attached to a first end of the beam. In any of the proceeding embodiments, the spring mass or stiffness may be selected to promote self-oscillatory motion. In any of the proceeding embodiments, the beam may have a cross-sectional geometry selected from the group consisting of a square, a rectangle, a cylinder, a reversed D-Beam (where the wind is primarily incident on the round portion of the beam rather than the flat portion), and an equilateral wedge in either a "greater than" or "less than" orientation relative to the incident wind. In any of the proceeding embodiments, the springs may be stretched in a resting state. In any of the proceeding embodiments, the beam mass may be selected to promote self-oscillatory motion. In a further aspect of the present invention, exposing the non-rotating wind energy generating apparatus of any of the proceeding embodiments to wind generates oscillatory motion in response to wind energy and generates electrical energy via motion of the non-rotating wind energy generating apparatus using electromagnetic induction. In a further aspect of the present invention, exposing the non-rotating wind energy generating apparatus of any of the proceeding embodiments to wind generates oscillatory motion in response to wind energy using self-excited oscillation caused by vortex shedding, transverse galloping, or some combination thereof, and generates electrical energy via motion of the non-rotating wind energy generating apparatus using electromagnetic induction.

Aspects of this invention relate to a novel approach to harnessing wind power. In an embodiment of the invention, the device uses the fluid flow principle of vortex shedding and transverse galloping to generate oscillatory, linear motion of a beam. In an embodiment of the invention, linear alternators optionally located near both ends of the beam generate electrical power when the beam is in motion.

In an aspect of the invention, a non-rotating wind energy generating apparatus comprises a suspended bluff body operable to initiate and sustain oscillatory motion in response to wind energy and a linear alternator system operable to generate energy via the motion of the suspended bluff body. In one or more embodiments, the suspended bluff body may comprise a frame movably supporting at least one beam, one or more first springs, one or more second springs, wherein the one or more first springs attach a first portion of the frame to a first portion of the beam and the one or more second springs attach a second portion of the frame to a second portion of the beam such that the beam is suspended between the first and second portions of the frame, and wherein the linear alternator system comprises at least one electromagnetic coil attached to one of the beam or a third portion of the frame, at least one magnet attached to one of the third portion of the frame or the beam, wherein motion of the beam when exposed to wind causes the first inductor to pass the at least one magnet. In any of the proceeding embodiments, the beam may have a D-shape. In any of the proceeding embodiments, the beam may be hollow. Any of the proceeding embodiments may further comprise one or more motion guides. Any of the proceeding embodiments may further comprise one or more additional beams, one or more additional upper springs, one or more additional lower springs, wherein the one or more additional upper springs attach a first portion of the additional beam to a third portion of the beam and the one or more additional lower springs attach a second portion of the additional beam to a fourth portion of the beam such that the one or more additional beams are suspended between the first and second portions of the frame. In any of the proceeding embodiments, the first portion of the frame may be an upper portion, the first portion of the beam may be an upper portion, the second portion of the frame may be a lower portion, and the second portion of the beam may be a lower portion. In any of the proceeding embodiments, the third portion of the frame may be a side portion. In any of the proceeding embodiments, the beam may be suspended substantially horizontally. In any of the proceeding embodiments, the motion of the beam may be substantially vertical. In any of the proceeding embodiments, a surface of the beam may be uniformly smooth. In any of the proceeding embodiments, a surface of the beam may be partially smooth. In any of the proceeding embodiments, a surface of the beam may be uniformly rough. In any of the proceeding embodiments, a surface of the beam may be partially rough. In any of the proceeding embodiments, at least one electromagnetic coil or the at least one magnet may be attached to a first end of the beam. In any of the proceeding embodiments, the spring stiffness may be selected to promote self-oscillatory motion. In any of the proceeding embodiments, the beam may have a cross-sectional geometry selected from the group consisting of a square, a cylinder, a reversed D-Beam (where the wind is primarily incident on the round portion of the beam rather than the flat portion), and an equilateral wedge in either a "greater than" or "less than" orientation relative to the incident wind. In any of the proceeding embodiments, the springs may be stretched in a resting state. In any of the proceeding embodiments, the beam mass may be selected to promote self-oscillatory motion. In a further aspect of the present invention, exposing the non-rotating wind energy generating apparatus of any of the proceeding embodiments to wind generates oscillatory motion in response to wind energy using vortex shedding, transverse galloping, or some combination thereof, and generates electrical energy via motion of the non-rotating wind energy generating apparatus using electromagnetic induction.

Further aspects of the invention relate to non-rotating wind energy generating apparatuses where a central axis of the at least one electromagnetic coil is substantially parallel to a longitudinal axis of the beam. In an embodiment of the invention, the at least one magnet is positioned relative to the at least one electromagnetic coil such that the beam when exposed to wind causes an electromagnetic coil to pass the at least one magnet generating electrical power.

In a further aspect of the invention, a non-rotating wind energy generating apparatus comprises a suspended bluff body operable to initiate and sustain oscillatory motion in response to wind energy and a linear alternator system operable to generate electrical energy via the motion of the suspended bluff body. In a further aspect of the invention, the suspended bluff body comprises a frame movably supporting at least one beam, the linear alternator system comprises at least one electromagnetic coil and at least one magnet, a central axis of the at least one electromagnetic coil is substantially parallel to a longitudinal axis of the beam, and the at least one magnet is positioned relative to the at least one electromagnetic coil such that motion of the beam when exposed to wind causes the first electromagnetic coil to pass the at least one magnet. In one or more embodiments, the at least one electromagnetic coil is attached to one of the beam or a third portion of the frame and the at least one magnet is attached to one of the third portion of the frame or the beam. In any of the proceeding embodiments, at least one electromagnetic coil can be spaced apart from the at least one beam by a mounting bracket. In any of the proceeding embodiments, the mounting bracket can position a central axis of the at least one electromagnetic coil along the same longitudinal axis as the central axis of the at least one beam. In any of the proceeding embodiments, the at least one magnet can be positioned in a space provided between the at least one electromagnetic coil and the beam. In any of the proceeding embodiments, at least one electromagnetic coil can extend beyond a face of the at least one beam. In any of the proceeding embodiments, at least one electromagnetic coil can be attached to the at least one beam and the at least one magnet can be attached to the frame. In any of the proceeding embodiments, at least one electromagnetic coil can be attached to the frame and the at least one magnet can be attached to the at least one beam.

Further aspects of the invention relate to non-rotating wind energy generating apparatuses where a linear alternator system comprises at least one electromagnetic coil attached to one of the beam or the frame and two or more pairs of magnets. In an embodiment of the invention, an electromagnetic coil passes through magnetic fields generated by the pairs of magnets generating electricity.

In a further aspect of the invention, a non-rotating wind energy generating apparatus comprises a suspended bluff body operable to initiate and sustain oscillatory motion in response to wind energy and a linear alternator system operable to generate electrical energy via the motion of the suspended bluff body, and the linear alternator system comprises at least one electromagnetic coil attached to one of the beam or the frame and two or more pairs of magnets. Additionally, in a further aspect of the invention, the two or more pairs of magnets are attached to one of the frame or the beam, and the at least one electromagnetic coil passes through magnetic fields generated by the two or more pairs of magnets. In one or more embodiments of the invention, a first side of a first magnet of a first pair of magnets faces a first side of a second magnet of the first pair of magnets, wherein the first side of the first magnet of the first pair of magnets has a polarity of North or South and the first side of the second magnet of the first pair of magnets has a polarity of North or South, wherein the polarity of the first side of the first magnet of the first pair of magnets differs from the polarity of the first side of the second magnet of the first pair of magnets, and wherein a first side of a first magnet of a second pair of magnets faces a first side of a second magnet of the second pair of magnets, wherein the first side of the first magnet of the second pair of magnets has a polarity of North or South and the first side of the second magnet of the second pair of magnets has a polarity of North or South, wherein the polarity of the first side of the first magnet of the second pair of magnets differs from the polarity of the first side of the second magnet of the second pair of magnets. In any of the proceeding embodiments, the polarity of the first side of the first magnet of the first pair of magnets can differ from the polarity of the first side of the first magnet of the second pair of magnets and the polarity of the first side of the second magnet of the second pair of magnets can differ from the polarity of the first side of the second magnet of the first pair of magnets. In any of the proceeding embodiments, a first side of a first magnet of a third pair of magnets can face a first side of a second magnet of the third pair of magnets, wherein the first side of the first magnet of the third pair of magnets can have a polarity of North or South and the first side of the second magnet of the third pair of magnets can have a polarity of North or South, wherein the polarity of the first side of the first magnet of the third pair of magnets can differ from the polarity of the first side of the second magnet of the third pair of magnets. In any of the proceeding embodiments, the polarity of at least one of the first side of the first magnet of the first pair of magnets, the first side of the first magnet of the second pair of magnets, and the first side of the first magnet of the third pair of magnets can differ from the polarity of at least one of the first side of the first magnet of the first pair of magnets, the first side of the first magnet of the second pair of magnets, and the first side of the first magnet of the third pair of magnets.

Further aspects of the invention relate to non-rotating wind energy generating apparatuses wherein the linear alternator system comprises at least one electromagnetic coil inset into one of a beam or a frame and at least one magnet inset in one of the frame or the beam. In an embodiment of the invention, motion of the beam when exposed to wind causes the at least one electromagnetic coil to pass at least one magnet generating energy.

In a further aspect of the invention, a non-rotating wind energy generating apparatus comprises a suspended bluff body operable to initiate and sustain oscillatory motion in response to wind energy and a linear alternator system operable to generate electrical energy via the motion of the suspended bluff body. In a further aspect of the invention, the suspended bluff body comprises a frame movably supporting at least one beam. Additionally, in a further aspect of the invention, the linear alternator system comprises at least one electromagnetic coil inset into one of the beam or the frame and at least one magnet inset in one of the frame or the beam, and a central axis of the at least one electromagnetic coil is substantially parallel to a longitudinal axis of the beam and motion of the beam when exposed to wind causes the at least one electromagnetic coil to pass at least one magnet. In one or more embodiments of the invention, the at least one electromagnetic coil is inset in the at least one beam and the at least one magnets is inset in the third portion of the frame. In one or more embodiments of the invention, the at least one electromagnetic coil is inset in the third portion of the frame and the at least one magnets is inset in the at least one beam.

Further aspects of the invention relate to a non-rotating wind energy transmission apparatus and method. In an embodiment of the invention, each of the two wire leads from each of the electromagnetic coils connect to a spring for electricity transmission and separate wire leads connect to each of the springs at the location of contact between the springs and the frame to continue the transmission of electricity from the springs to a preferred point of use.

In a further aspect of the invention, a non-rotating wind energy transmission apparatus comprises a suspended bluff body operable to initiate and sustain oscillatory motion in response to wind energy and a linear alternator system operable to generate electrical energy via the motion of the suspended bluff body. In a further aspect of the invention, the suspended bluff body comprises a frame movably supporting at least one beam. Additionally, in a further aspect of the invention, the linear alternator system comprises at least one electromagnetic coil attached to one of the beam the frame and at least one magnet attached to one of the frame or the beam. Also, in a further aspect of the invention, motion of the beam when exposed to wind causes the at least one electromagnetic coil to pass at least one magnet and a first wire lead from the at least one electromagnetic coil is connected to at least one of the one or more first springs and a second wire lead from the at least one electromagnetic coil is connected to the other of the at least one of the one or more second springs. In one or more embodiments of the invention, a third wire lead from at least one of the one or more first springs can be connected to the first portion of the frame and a fourth wire lead from the other of the at least one of the one or more second springs can be connected to the second portion of the frame. In any of the proceeding embodiments, the first and second portions of the frame are configured for transmission of electricity from the first and second springs to one or more points of use.

Further aspects of the invention relate to a method for electricity transmission comprising generating electricity using an apparatus according to any of the embodiments described above and transmitting electricity from one or more wire leads of the one or more springs to the frame.

It is an object of the present invention to provide a non-rotating alternative to wind turbines, which produces comparable electrical power and which is portable, easy to transport, and less susceptible to damage. In some embodiments, the device is considerably smaller than a residential or large scale wind turbine. In some embodiments, the device can be easily disassembled, stowed, and transported to remote areas such as a campsite or forward operating military base. In some embodiments, the device operation allows for inconspicuous and virtually silent operation.

BRIEF DESCRIPTION OF THE DRAWING

The foregoing and other objects, features and advantages of the invention will be apparent from the following description of the preferred embodiments of the invention, as illustrated in the accompanying drawings.

DETAILED DESCRIPTION

Figure 1:
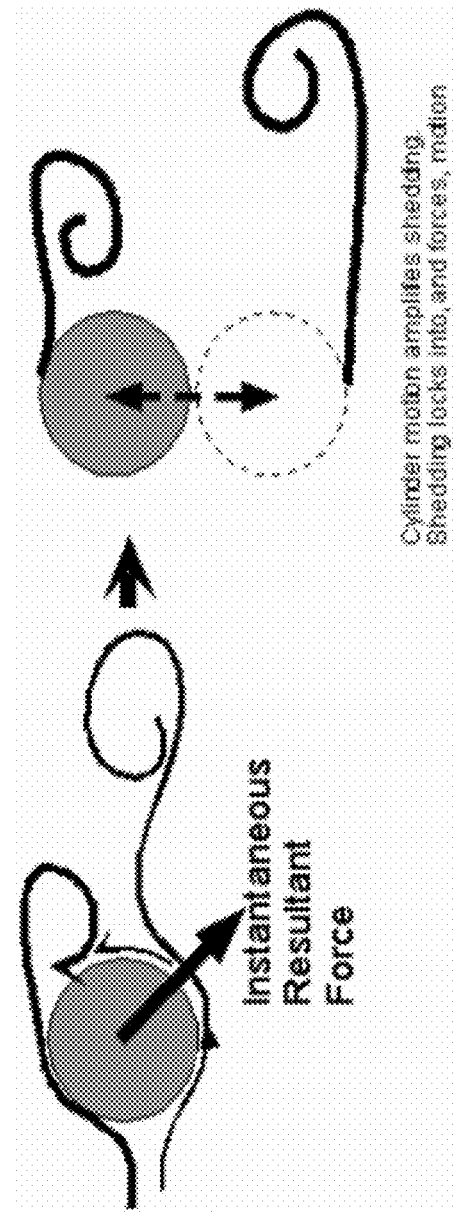
FIG. 1 is a schematic illustration of Vortex Shedding, demonstrating the formation of vortices and subsequent motion.

Aspects of this invention relate to a novel approach to harnessing wind power. In one aspect, a device is provided to generate electricity from non-rotational motion caused by wind flow. Wind is typically characterized as unsteady flow; therefore the device is capable of operation in unsteady flow characteristics. To maximize the system efficiency, losses due to friction and drag are minimized, and methods of electrical energy harvesting are optimized. The device is easy to transport and deploy. A nominal wind speed of approximately 6 m/s is used as the basis for the prototype design and testing. However, the full-scale system is able to operate over a wide range of wind speeds.

Non-rotating wind energy generation is provided by first establishing non-rotating motion from wind flow, and then using that motion to generate electricity. In one aspect, a device does not use rotational motion similar to wind turbines currently on the market, but instead, the device uses self-excited oscillation caused, for example, by the fluid flow principle of vortex shedding, transverse galloping, or some combination thereof, to generate oscillatory, linear motion of a beam.

The phenomenon of vortex shedding involves the formation of alternating vortices which form behind a bluff body when it is placed in fluid flow. An oscillating resultant lift force acts on the body as these vortices are shed. Vortex shedding is caused when a fluid flows past a blunt object. The fluid flow past the object creates alternating low-pressure vortices on the downstream side of the object and the object will tend to move toward the low-pressure zone. Eventually, if the frequency of vortex shedding matches the resonance frequency of the structure, the structure will begin to resonate and the structure's movement can become self-sustaining. The transverse galloping phenomenon is a form of aerodynamic instability that can result in large amplitude oscillations of a body with certain cross sections. Galloping can occur due to the aerodynamic forces that can be induced by the transverse motions of the structure. These aerodynamic self-excited forces can act in the direction of the transverse motion, which can result in negative damping, which can increase the amplitude of the transverse motion until it reaches a limit cycle. Galloping-induced oscillations can be caused by forces which act on a structural element as it is subjected to periodic variations in the angle of attack of the wind flow. Usually the periodically varying angle of attack is generated by a cross-wind oscillation of the structure. The potential susceptibility of a structure to galloping starting from a given equilibrium position can be evaluated using the well-known Den Hartog stability criterion. Galloping is a low frequency phenomenon, that can take place at much lower frequencies than vortex shedding. In addition galloping instability can be caused by the change with the body angle of attack of aerodynamic forces, whereas vortex shedding can be a characteristic of the body wake formation. Therefore, although in certain circumstances both phenomena can appear simultaneously, they generally are uncoupled and can be analyzed separately.

The intensity of these vortices and resulting lift force are directly related to the cross-sectional shape and size of the bluff body. The formation of vortices and subsequent motion is shown in FIG. 1. It is possible to predict the frequency at which these vortices will occur by using a dimensionless constant called the Strouhal Number (St) (See Equation 1, below).

$$St = \frac{fL}{v} \quad (1)$$

In this equation, f is the vortex shedding frequency, L is the characteristic length (See Equation 2, below), and v is the velocity of the fluid flow before it contacts the body.

$$L = \frac{4A}{P} \quad (2)$$

Equation 2 gives the definition of hydraulic diameter where A is the area of the submersed body, and P is the wetted perimeter of the body. Characteristic length L appears in both Strouhal and Reynolds numbers.

When a body is placed in a fluid flow within a certain range of Reynolds number, a series of vortices occur at a frequency which can be predicted by the Strouhal number. Equation 3 defines Reynolds number as a function of the velocity of the fluid before it contacts the body (approach velocity), V, the characteristic length, L, the density of the fluid ρ, and the viscosity of the fluid, μ.

$$Re = \frac{\rho V L}{\mu} \quad (3)$$

Figure 2:
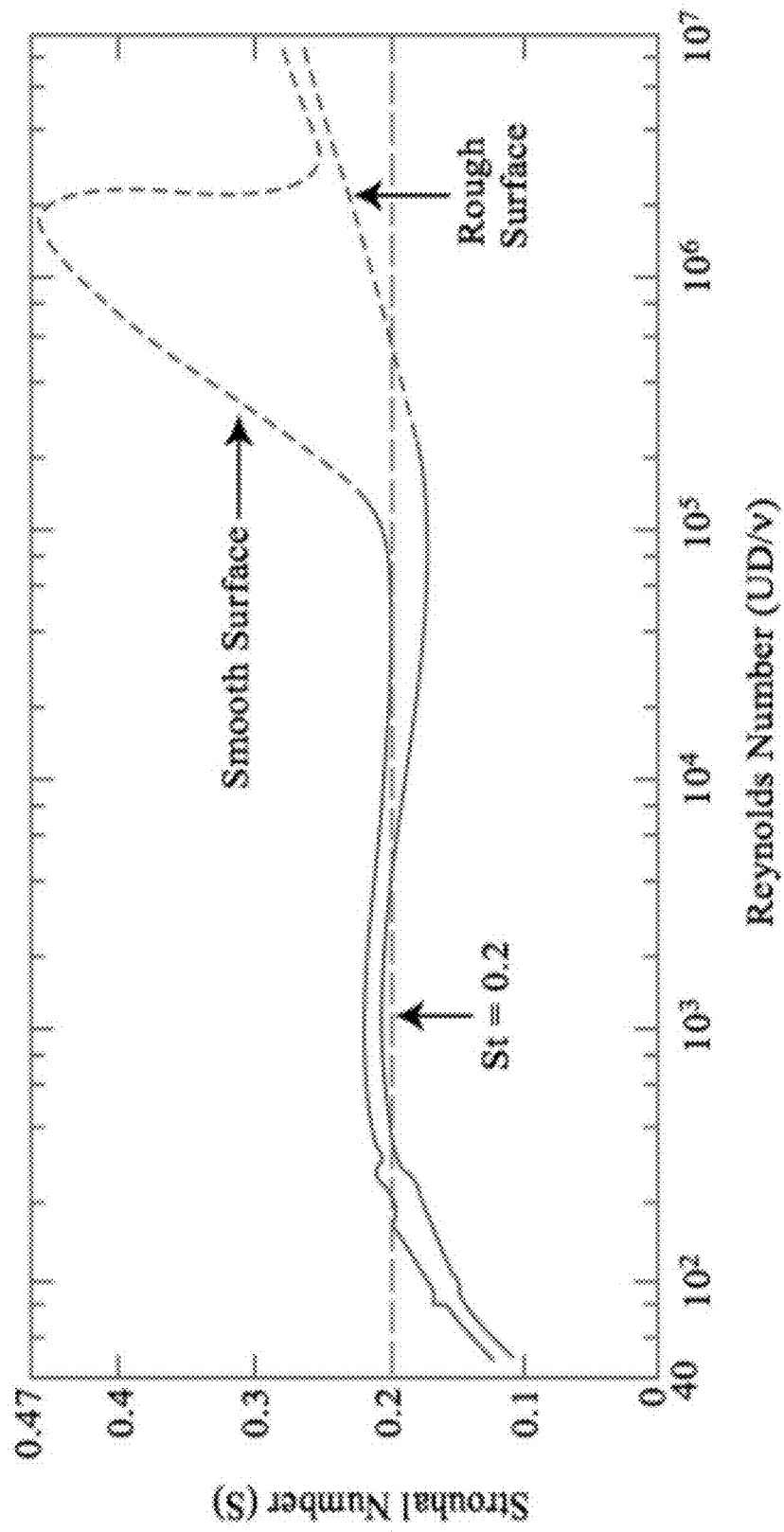
FIG. 2 is a graph of Reynolds Number vs. Strouhal Number showing the relationship between Strouhal number and Reynolds number for circular cylinders.

An acceptable range of Reynolds numbers for predictable vortex shedding is displayed in FIG. 2. The curves in FIG. 2 are for a circular cylinder. The reported value for the Strouhal number for a D-Beam is 0.21 (See, e.g., Applied Fluid Dynamics Handbook by Robert D. Blevins, Van Nostrand Reinhold Company, 1984) and is independent of the Reynolds number. FIG. 2 depicts a straight horizontal line that is representative of the Strouhal number for a D-beam. From equation (1) above, f=StV/L, thus with a constant St for a D-beam, the frequency of oscillation increases with the wind speed and decreases as L increases. For a given average wind velocity, one can size the beam for the desired frequency. For other shapes, the Strouhal value may differ, but a similar process can be used to size a bluff body for a desired frequency. A certain set of flow conditions must exist in order for the shedding frequency to occur. Each vortex created in this series of vortices, called a Von Karman Vortex Street, carries alternating high and low pressure regions. The bluff body is drawn to the low pressure regions creating an oscillating resultant force. In embodiments of the present invention, this force is used to initiate motion of the generator system.

In one or more embodiments, the beam design is selected to provide self-excited vibrations when exposed to wind. Self-excited vibration is a phenomenon in which the motion of a system causes it to oscillate at its natural frequency with continually growing amplitude. In one or more embodiments of the invention, vortex shedding will initiate self-excited vibration of a beam. In one or more embodiments, a beam will continue to oscillate at the system's natural frequency when exposed to a wind flow. In one or more embodiments, the system controls the amplitude of oscillation using springs. In further more embodiments, the system utilizes stops to limit the amplitude of oscillation.

Figure 3:
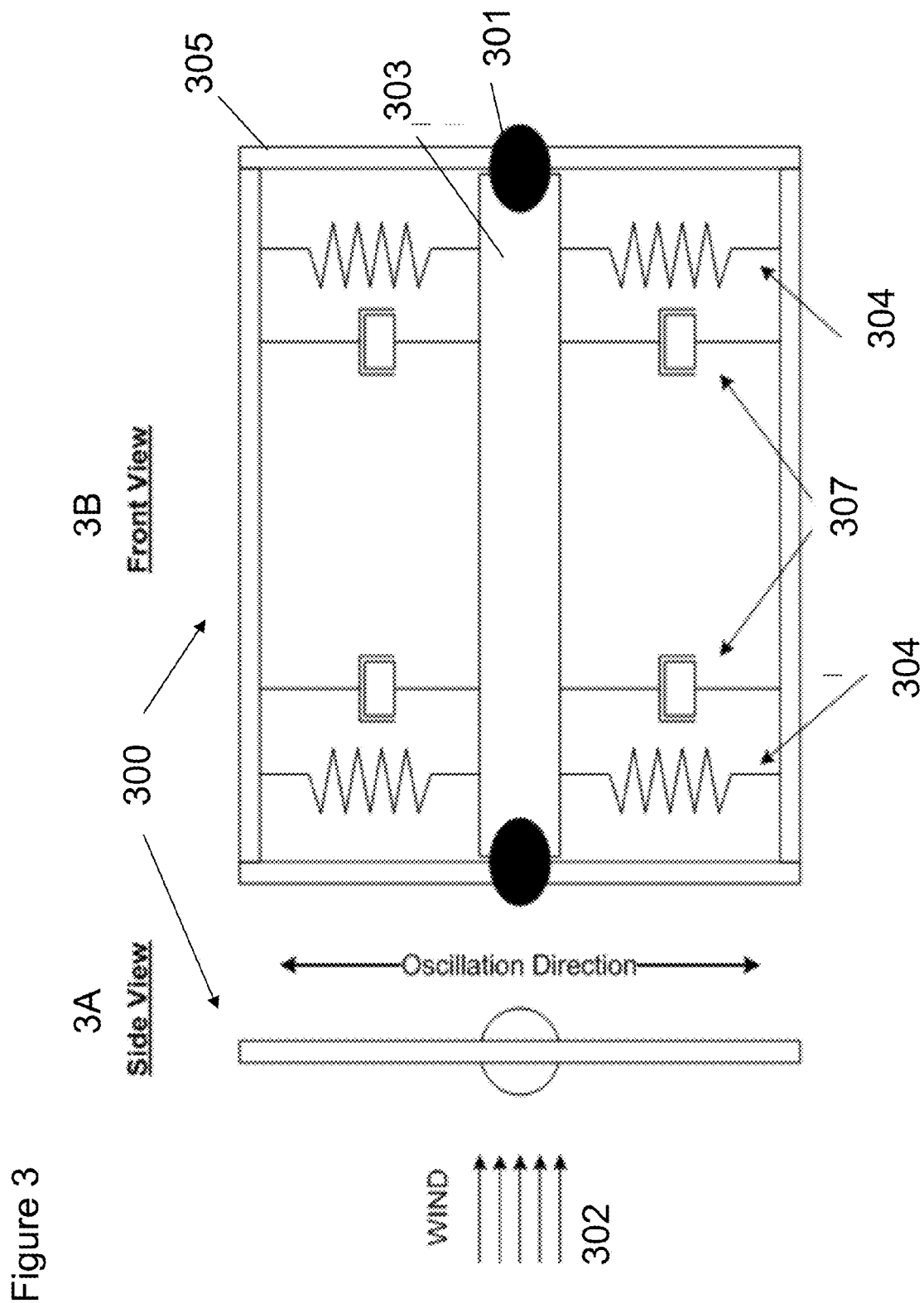
FIG. 3 is a schematic illustration of a non-rotational wind generating energy generator according to one aspect of the invention as shown in side view (3A) and front view (3B).

FIG. 3 is a schematic illustration of a non-rotational wind energy generator 300 according to one aspect of the invention. In one aspect, a beam 303 is slidably mounted in a frame 305 to provide oscillatory motion of the beam due to vortex shedding, transverse galloping, or a combination thereof, that is substantially perpendicular to the wind direction 302, or which has a component that is substantially perpendicular. The beam is equipped with at least a pair of springs 304 positioned above and below the beam to provide restorative force to the beam subjected to vortex shedding, transverse galloping, or a combination thereof. This provides oscillatory motion of the beam while in wind contact. The springs can be secured to the frame using conventional methods such as latches, hooks, welds, bonds and the like. Due to the high stress experienced by the spring or other joining device, the securing method desirably provides high material strength and low fatigue life. To maintain a constant spring rate, coil diameter and/or number of coils must increase as wire diameter increases. Linear alternators 301 are shown located near both ends of the beam; however, they can be located anywhere in any number. They generate electrical power when the beam is in motion. A damping system 307 can be provided to further control the amplitude of the oscillations.

The non-rotating wind energy generating device uses the interaction of the beam with wind to induce vortex shedding, transverse galloping, and linear motion, which is then converted to electrical power with electromagnetic inductors, also referred to as linear alternators. In one or more embodiments, the linear alternators incorporate magnets that are concentric with the wire coil. Other embodiments may use multiple pairs of parallel, stationary magnets and electromagnetic coils, such as electromagnetic coils with a circular or square shape, that are fixed to a beam that passes between the magnets during operation. The use of a parallel magnet/coil configuration has been experimentally proven to be superior to a concentric magnet/coil configuration in at least one embodiment. This configuration permits a larger clearance between the magnets and coils. This helps prevent damping caused by rubbing during beam motion. The use of parallel stationary magnets increases the strength of the magnetic field in the linear inductors, also referred to as linear alternators. Magnetic field strength is a contributing factor of electrical power generation in magnetic inductors using electromagnetic induction.

Figure 4A:
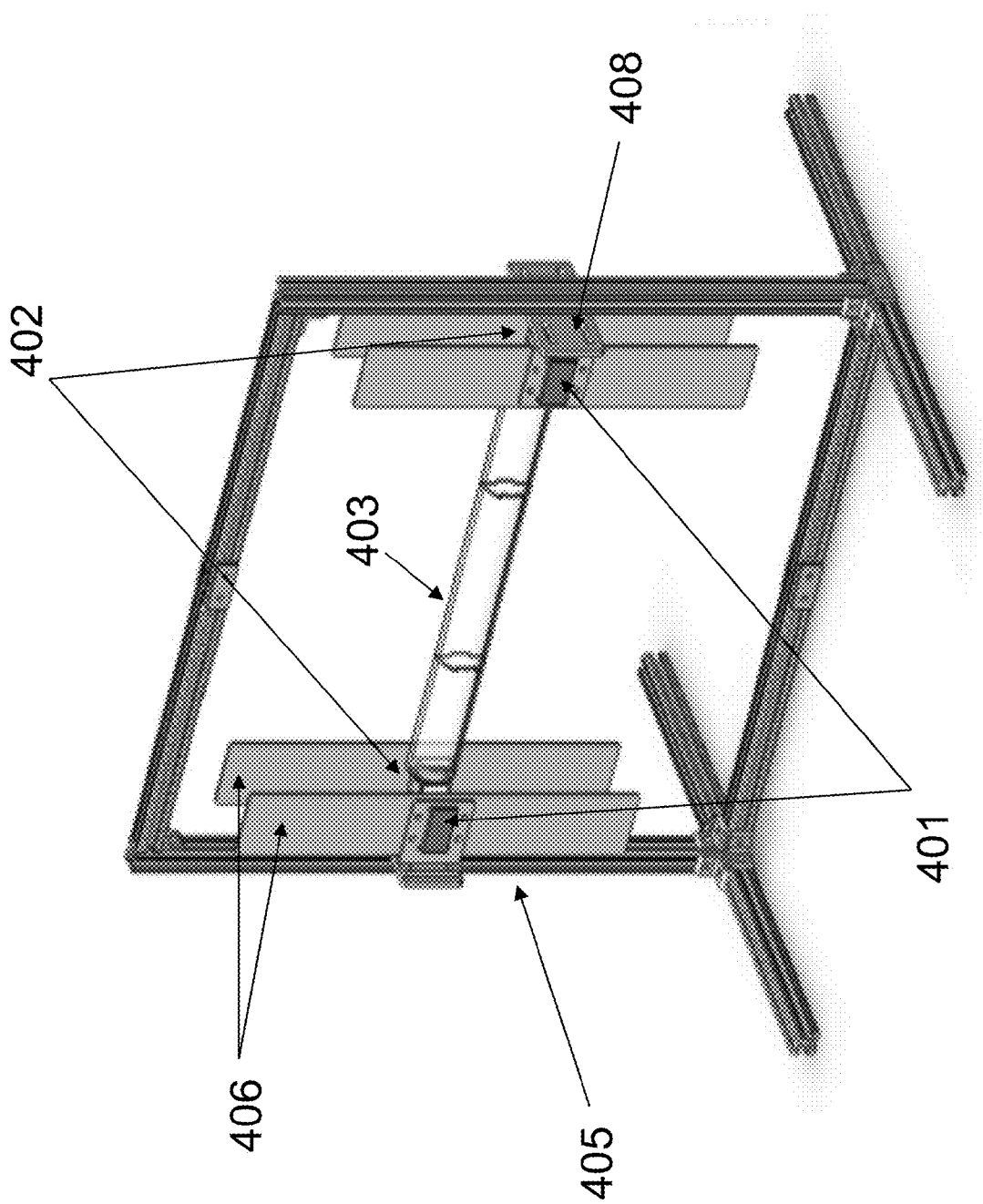
FIGS. 4A and 4B provide perspective views of a non-rotating wind energy generator according to an embodiment of the invention.
Figure 4B:
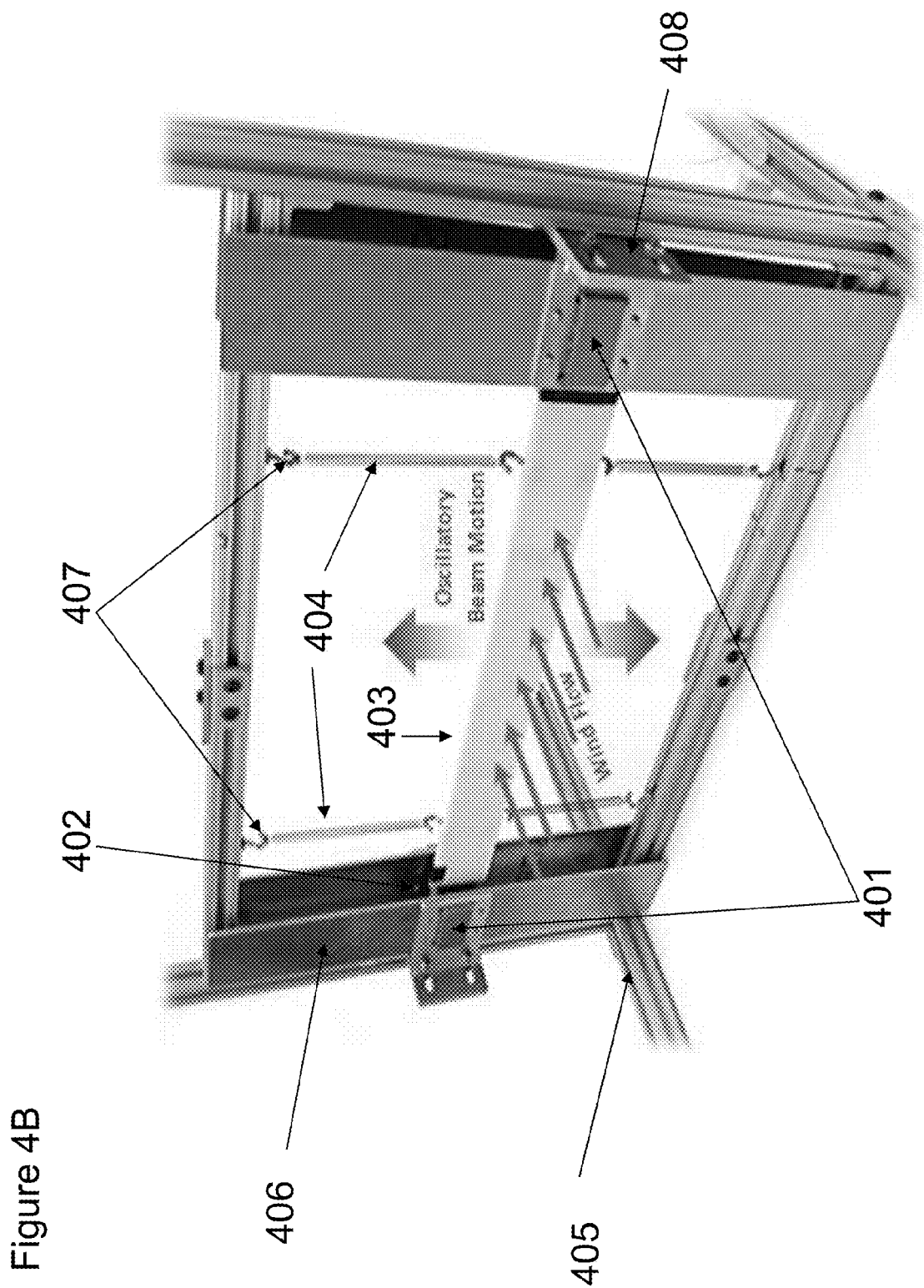

FIGS. 4A and 4B depict a non-rotating wind energy generator according to an embodiment of the present invention. In this embodiment, there are magnets 401, inductor assemblies, also referred to as linear alternator assemblies, 402, a beam 403, springs 404, a frame 405, guiderails 406, and adjustable L-brackets 408. In this embodiment, the beam 403 and the frame 405 each have four connection points consisting of J-hooks 407. The frame height is adjusted by moving the top member up or down to pre-drilled hole locations. The frame is constructed of wood, metal, plastic or any other material that provides sufficient support for the beam during oscillation. For example, the frame should not distort or bend under operational forces. In this embodiment, four springs 404 attach the beam 403 to the frame 405 via the J-hooks 407. In this embodiment, there is clearance space between the beam 403 and the adjustable L-brackets 408 and between the beam 403 and the wind guards 406. Wind guards reduce the lateral pressure of the wind against the beam in the motion guides and keep the beam oscillating in the correct direction while reducing the amount of friction.

In an embodiment of the invention, wind energy is used to induce self-excited oscillations of the suspended beam 403. The fluid flow phenomena of vortex shedding, transverse galloping, or a combination thereof, are harnessed to initiate and sustain oscillatory motion of one or more beams 403. This reciprocating motion is used to generate electricity via electromagnetic induction using the magnets 401 and the linear alternator assemblies 402. An embodiment of an linear alternator assembly is described in greater detail in FIG. 9. In some embodiments of the invention, magnets are stationary and electromagnetic coils, such as wire coils, move relative to the magnets. In further embodiments of the invention, electromagnetic coils, such as wire coils, are stationary and magnets move relative to the electromagnetic coils. In still further embodiments of the invention, both magnets and electromagnetic coils, such as wire coils, may move.

When vortex shedding and transverse galloping occur in the system, such as when the vortex shedding frequency matches the natural frequency of the system, extremely large amplitude of motion will be achieved. In embodiments of the invention, the spring system controls and maintains oscillatory behavior. The springs may have the same spring tension in order to keep the beam suspended. In embodiments of the invention, the number, size, and stiffness of the springs may be varied. Oscillatory movement is not solely caused by vortex shedding. A phenomenon called transverse galloping, which can result in self-excited oscillations, may also be responsible for continuous motion in embodiments of the invention. In embodiments of the invention, after vortex shedding induces a small displacement input, the motion of the system itself due to transverse galloping causes it to oscillate at its natural frequency while in a wind flow. In some embodiments of the invention, springs 404 range in constants from 0.1 lbs/in up to 3 lbs/in.

In embodiments of the invention, a second beam (or more) may be mounted in parallel to the first beam for a two degree (or more) of freedom system.

Figure 5:
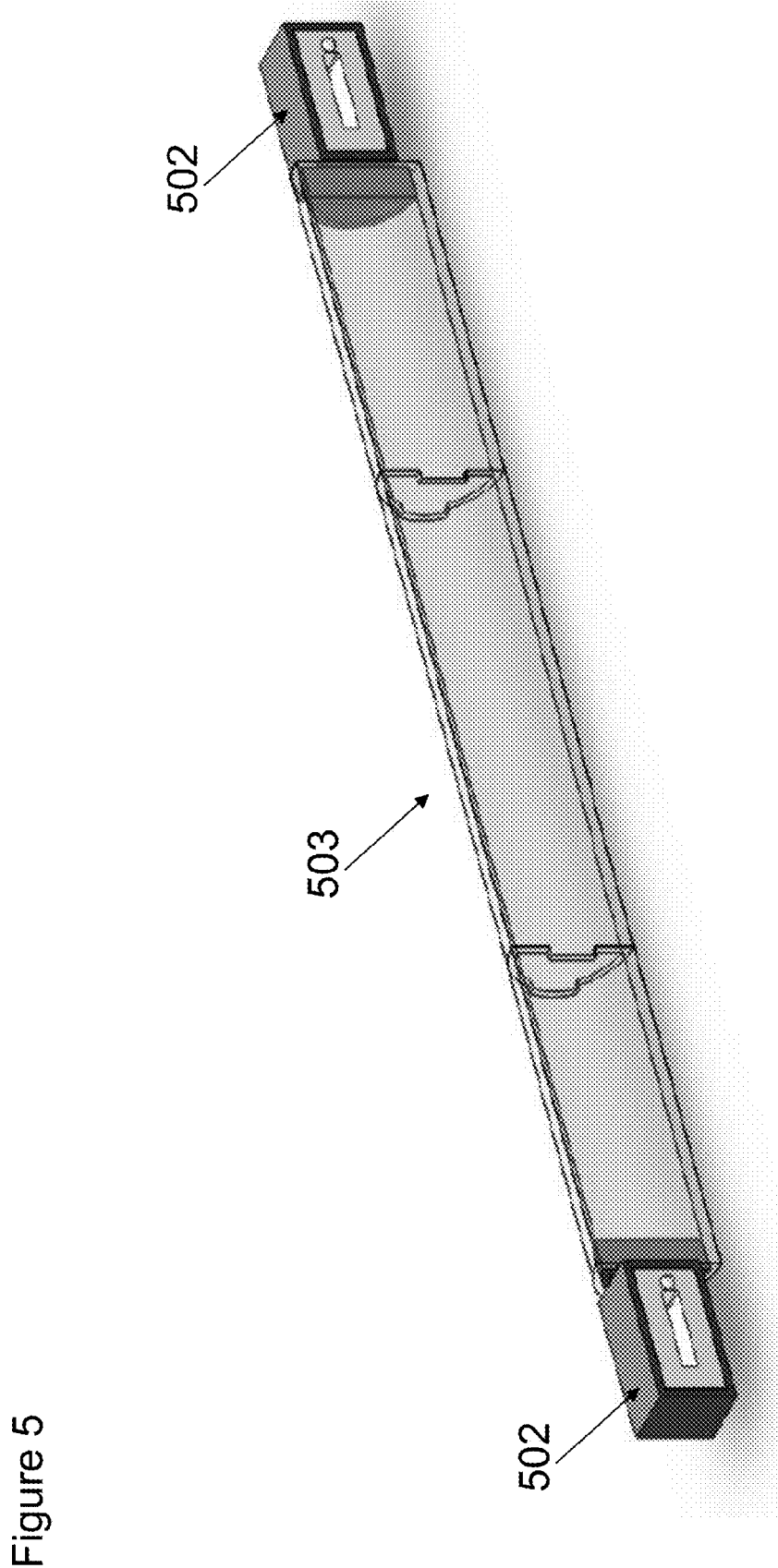
FIG. 5 is a perspective illustration of a beam according to one or more embodiments.

FIG. 5 shows the beam 501 according to an embodiment of the invention. In this embodiment, the beam is hollow on the inside and has a D-shape, and the inductor assemblies 502 are attached to each end of the beam 501. In an embodiment of the invention, the D-shaped beam has a length of 24 inches (exclusive of the inductor assemblies), a diameter of 2 inches, wall thickness of ⅛ inch, and a weight of 0.5 pounds. In an embodiment of the invention, an equivalent spring stiffness of 0.5 lbs/in may be used with a 0.5 lb beam.

In other embodiments, other beam shapes may be used. For example, the beam may be a square, a rectangle, a cylinder, a reversed D-Beam (where the wind is primarily incident on the flat portion of the beam rather than the round portion), and an equilateral wedge in either a "greater than" or "less than" orientation relative to the incident wind. Additionally, in embodiments of the invention, the surface of the beam may be smooth, and in further embodiments of the invention, the surface may be rough, uniformly or at selected locations. In embodiments of the invention, the beam may be fitted with weights for optimal mass to adjust the frequency and amplitude.

One or more beams can be used in the non-rotating wind energy device. In some embodiments, the plurality of beams can include a rigid spacer between beams and the multi-beam system can be secured to the frame by springs attached to the upper and lower beams. In other embodiments, the plurality of beams can be joined by springs to one another and to the frame.

Figure 11:
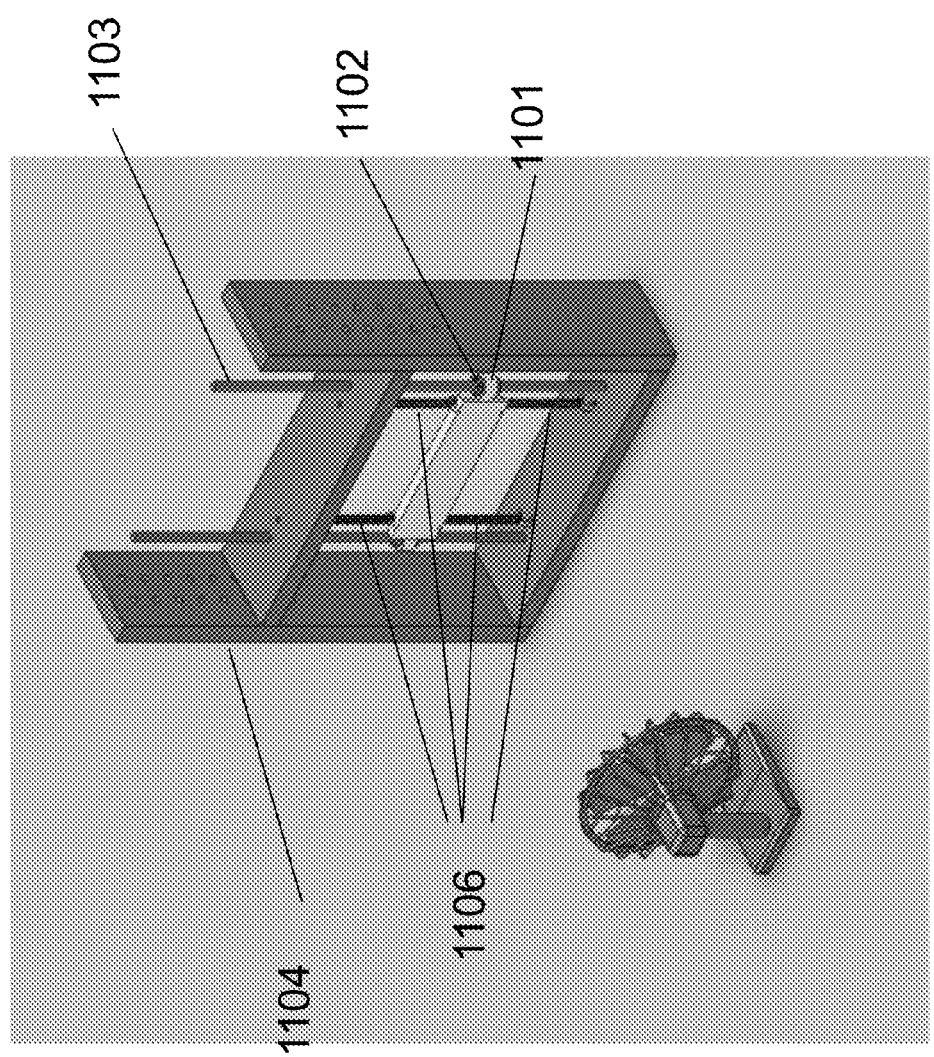
FIG. 11 illustrates a mounting system for mounting a beam onto a frame according to one or more embodiments.

Each beam can be secured to the side of the frame using a variety of conventional means. For example, the beams can terminate at each side in a ring 1100 having a central conduit 1101 and a rod 1102 can be mounted through the central conduit for securing the beam to the frame 1103. The central conduit can be fitted with linear or ball bearings to reduce resistance. An exemplary mounting system is shown in FIG. 11. In this embodiment, four pre-stretched springs 1106 are attached to the top and bottom of the assembly. This pre-stretch can be adjusted by raising the top beam of the frame.

In other embodiments, a bumper style system is used in which the system should oscillate freely. If there is a large gust of wind, the wind guards will keep the beam oscillating in the correct direction while reducing the amount of friction. FIGS. 4A and 4B show wind guards oriented vertically and placed near the sides of the frame on the front and back of the apparatus; however, they may be located anywhere in any number.

Figure 12:
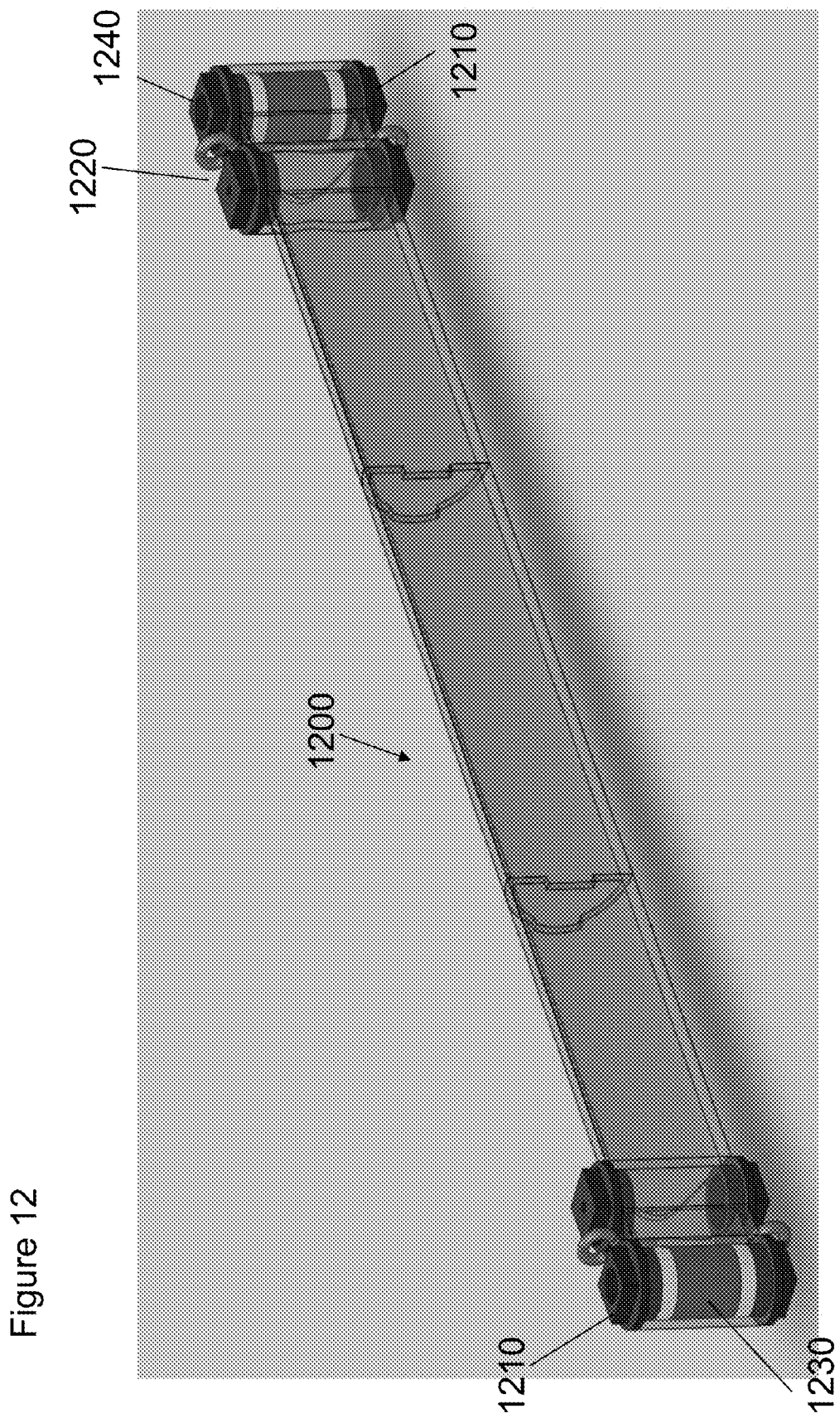
FIG. 12 is a perspective drawing of a beam according to one or more embodiments of the invention.

A further embodiment of the beam is shown in FIG. 12. The beam 1200 itself can be hollowed out to minimize mass. At either end, there are two cylindrical containers 1210. Weight can be added to the containers to adjust the mass of the beam for certain applications, or a electromagnetic coil 1230 can be fabricated to slip into the container to accommodate the induction system. Snap-in caps 1220 that cover the cylindrical containers also serve the function of acting as bumpers. A hole 1240 can be drilled in the top of each cap with a diameter larger than the guide rail on which it lies.

Figure 6:
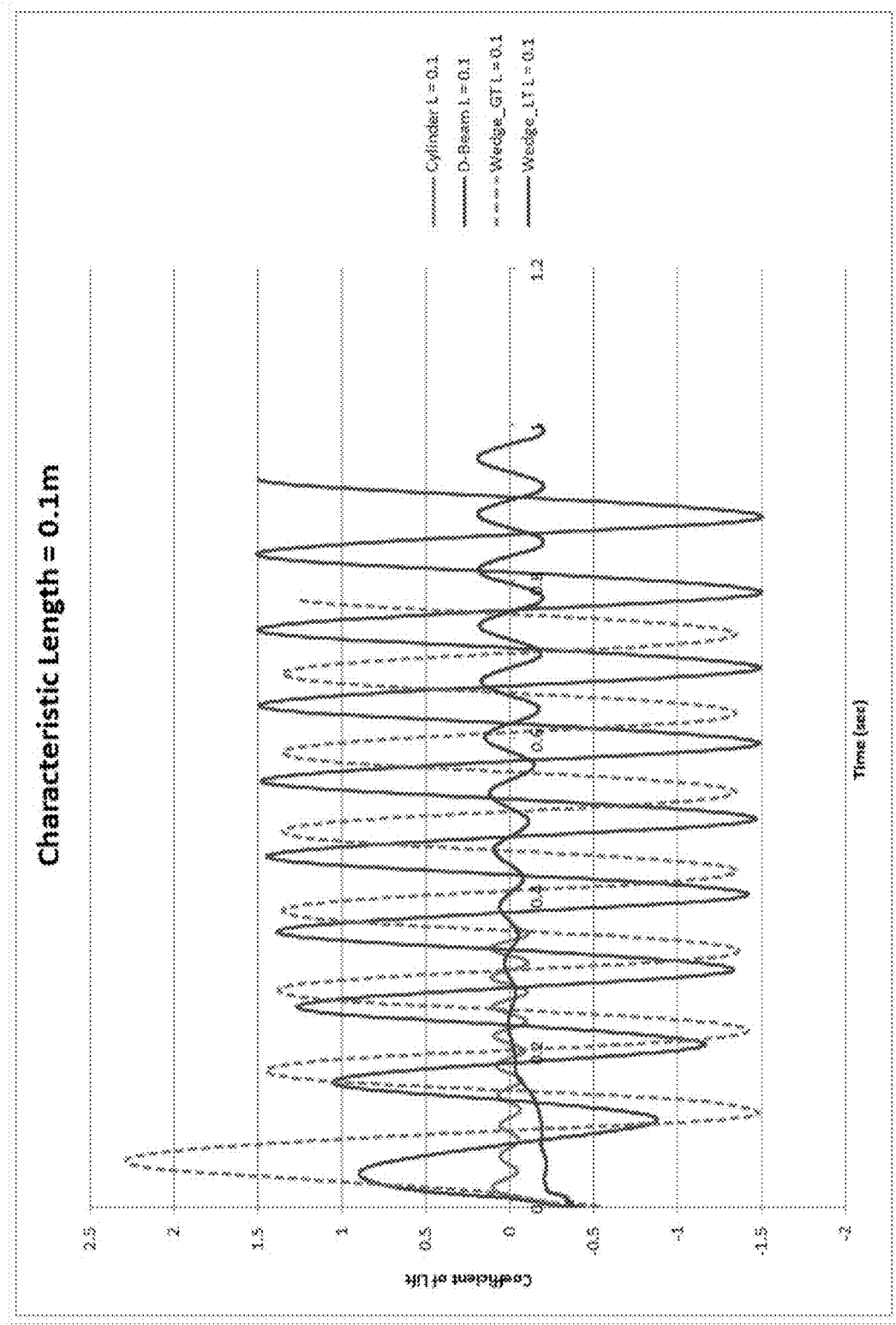
FIG. 6 is a plot of the coefficient of lift vs. time (sec) for a series of beams having four different cross-sectional shapes, each at the same characteristic length.

FIG. 6 is a plot of coefficient of lift v. time for a beam having different shapes. In order to provide the ability to compare, the characteristic length of each beam was kept constant at 0.1 m. Beams having cross-sectional shapes of cylinder, D-beam, 'greater than' wedge and 'less than' wedge were compared. D-beams showed a lift that was steady and that maintained large amplitude as compared to other modeled beam systems.

Figure 7:
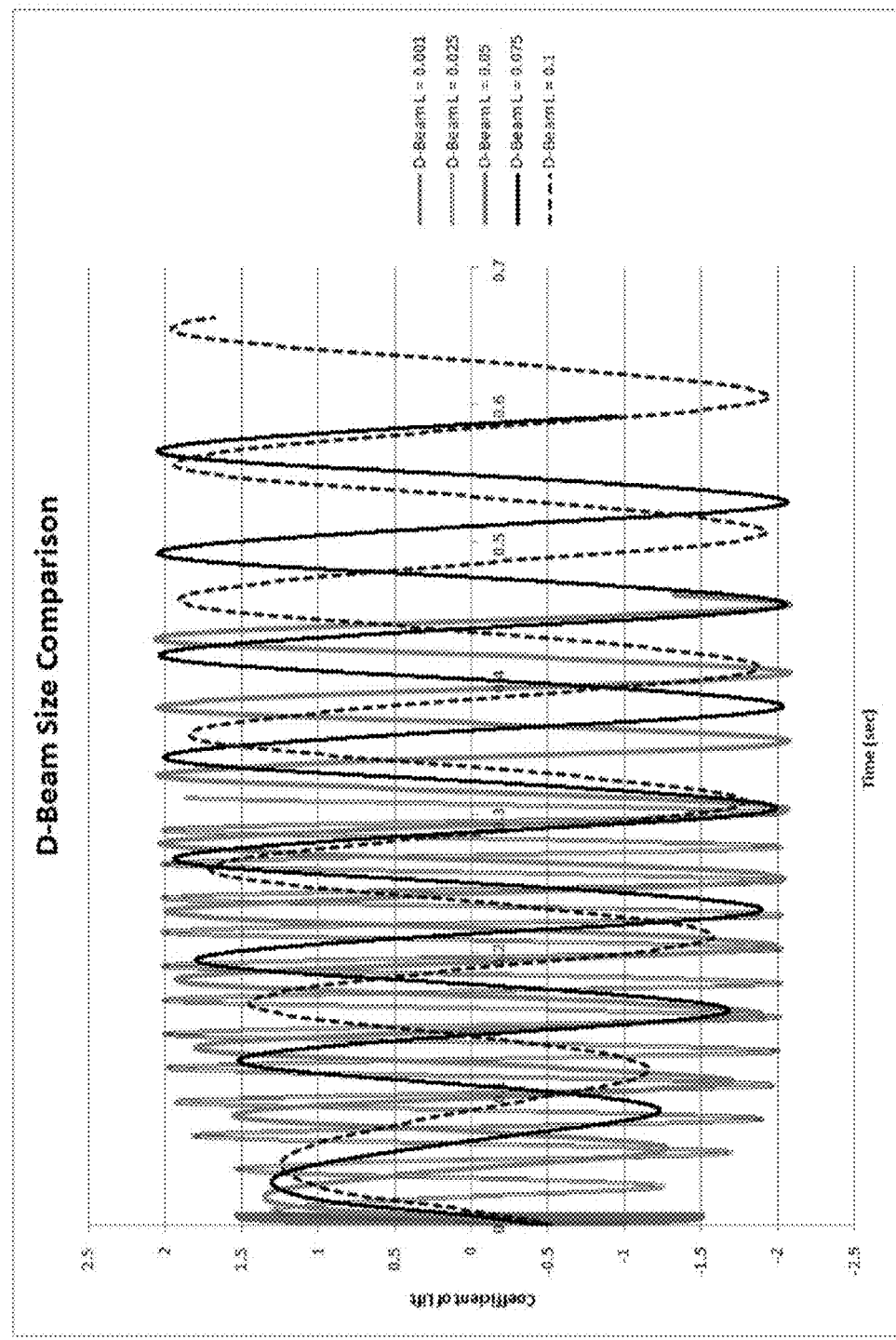
FIG. 7 is a plot of the coefficient of lift vs. time (sec) for a series of D-beams having a characteristic length of 0.001 m, 0.025 m, 0.05 m, 0.075 m and 0.1 m.

The length of the beam can be varied to provide oscillatory amplitude and frequency for any desired application. Each characteristic length of a beam for a given beam shape and material typically provides the same magnitude of the coefficient of lift. However, as the characteristic length decreases (all things being equal), the frequency of vortices increases. This is demonstrated in FIG. 7, where the properties of D-beams having different characteristic lengths were modeled. In FIG. 7, the coefficient of lift is plotted vs. time (sec) for a series of D-beams having a characteristic length of 0.001 m, 0.025 m, 0.05 m, 0.075 m and 0.1 m. While amplitude was similar, frequency varied with the change in beam length. While such a relationship between frequency and beam length is observed, the spring force will also play a significant role in the oscillation frequency. In one or more embodiments, amplitude is dependent upon working spring length, initial stretch, spring constant, and wind speed. A range of springs with varying spring constants and spring lengths can be used to provide the desired spring constant.

Figure 8:
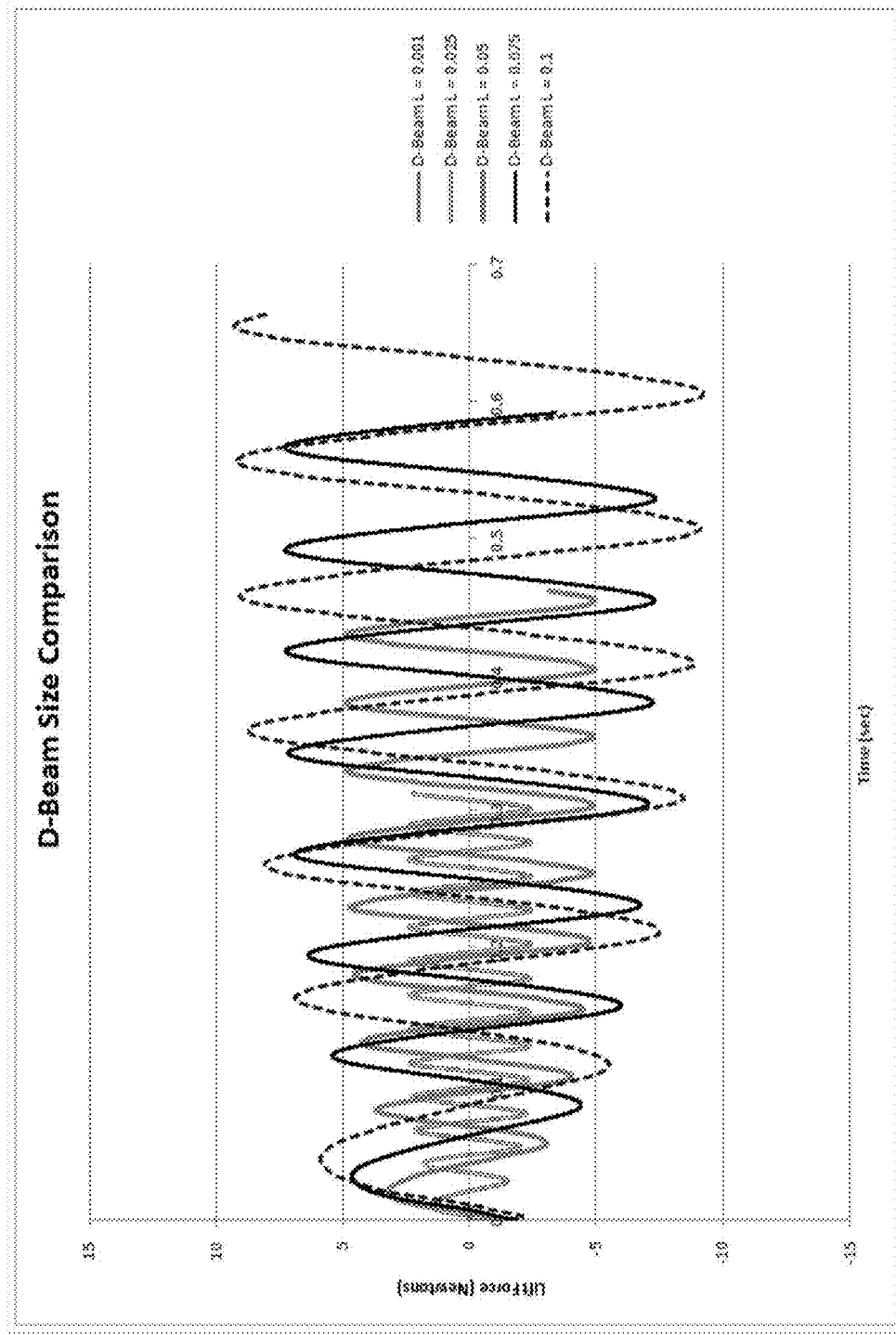
FIG. 8 is a plot of lift force (N) vs. time (sec) and demonstrates how the size of a beam (here a D-beam) affects the lift force produced by vortex shedding.

FIG. 8 is a plot of lift force (N) vs. time (sec) and demonstrates how the size of a beam (here a D-beam) affects the lift force produced by vortex shedding. As size increases, frequency decreases and lift force increases. The selection of the beam having length, shape and diameter provides a non-rotating wind energy generator having a selected (high) frequency and amplitude. In a preferred embodiment of the invention, the beam has a D-shape. Beam frequency and lift force are provided in Table 1 for an exemplary D-beam.

TABLE 1

| Shape | Characteristic Length | Frequency (Hz) | Maximum Lift Force (N) | Forcing Function |
|---|---|---|---|---|
| D-Beam | 0.001 | 1041.667 | 0.073 | F(t) = 0.073cos(6544.985t) |
| D-Beam | 0.025 | 40.161 | 2.396 | F(t) = 2.396cos(252.337t) |
| D-Beam | 0.050 | 20.000 | 4.890 | F(t) = 4.89cos(125.664t) |
| D-Beam | 0.075 | 13.423 | 7.312 | F(t) = 7.312cos(84.338t) |
| D-Beam | 0.100 | 10.204 | 9.458 | F(t) = 9.458cos(64.114t) |

In one or more embodiments, the beam design is selected to provide self-excited oscillations by, for example, inducing transverse galloping when exposed to wind. Transverse galloping is a phenomenon in which the motion of a system causes it to oscillate at its natural frequency with continually growing amplitude. In the case of this design, a D-beam will continue to oscillate at the systems natural frequency when exposed to a wind flow. In order to provide a self-exciting system that oscillates at its natural frequency, the force required to move the beam can be decreased by using lower mass and spring rates.

Linear electromagnetic induction is provided for generating usable amounts of electrical power. Faraday's Law states that voltage is equal to the rate of change of magnetic flux. Faraday's Law and magnetic flux are shown in Equations 6 and 7 respectively. A permanent magnet forms the magnetic field and the energy is captured via a loop of wire moving through that field.

$$\varepsilon = \frac{d\varphi_B}{dt} \quad (6)$$

$$\varphi_B = BA\cos(\theta) \quad (7)$$

$\varepsilon$ is the induced voltage, $\varphi_B$ is the magnetic flux, B is the magnetic field strength, A is the cross sectional area of the loop, and $\theta$ is the angle that the magnetic field makes with a vector normal to the area of the loop.

Some current designs involve moving a magnet through a stationary electromagnetic coil, while others involve the movement of an electromagnetic coil over a stationary magnet. It is important to note that the change in magnetic flux defines the amount of voltage generated. All rotational electric generators use electromagnetic induction to generate voltage by spinning a coil of wire through a magnetic field. The ever-changing magnetic flux due to the continuously changing $\theta$ creates a constant voltage.

Figure 9:
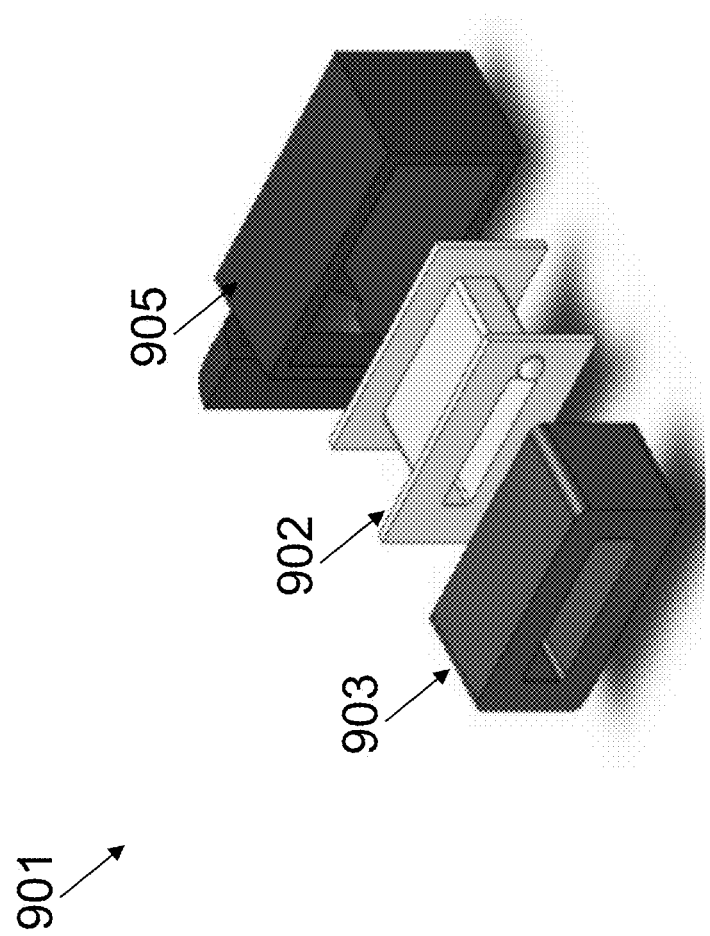
FIG. 9 shows the electromagnetic coil assembly according to an embodiment of the invention.

FIG. 9 shows the electromagnetic inductor assembly 901 according to an embodiment of the invention. In this embodiment, the inductor assembly 901 comprises a spool 902, wire 903, which wraps around the spool 902, and an end-cap 905 of the beam, into which the spool 902 and wire 903 fit. In one or more embodiments, the moving beam contains the spool of wire and the coil of wire passes over a stationary magnet. In other embodiments, the support frame holds the coil of wire and the moving beam bearing a permanent or electric magnet passes over the stationary wire coil.

In embodiments of the invention the number of turns, wire gauge, and other properties of the inductor assembly may be varied. In an embodiment of the invention, 32 gauge wire may be used.

In embodiments of the invention, a parallel magnet linear alternator is used to generate electricity from the reciprocating beam motion. Such a linear alternator can overcome motion-damping issues that can occur in embodiments with concentric magnet and coil configurations.

Figure 10:
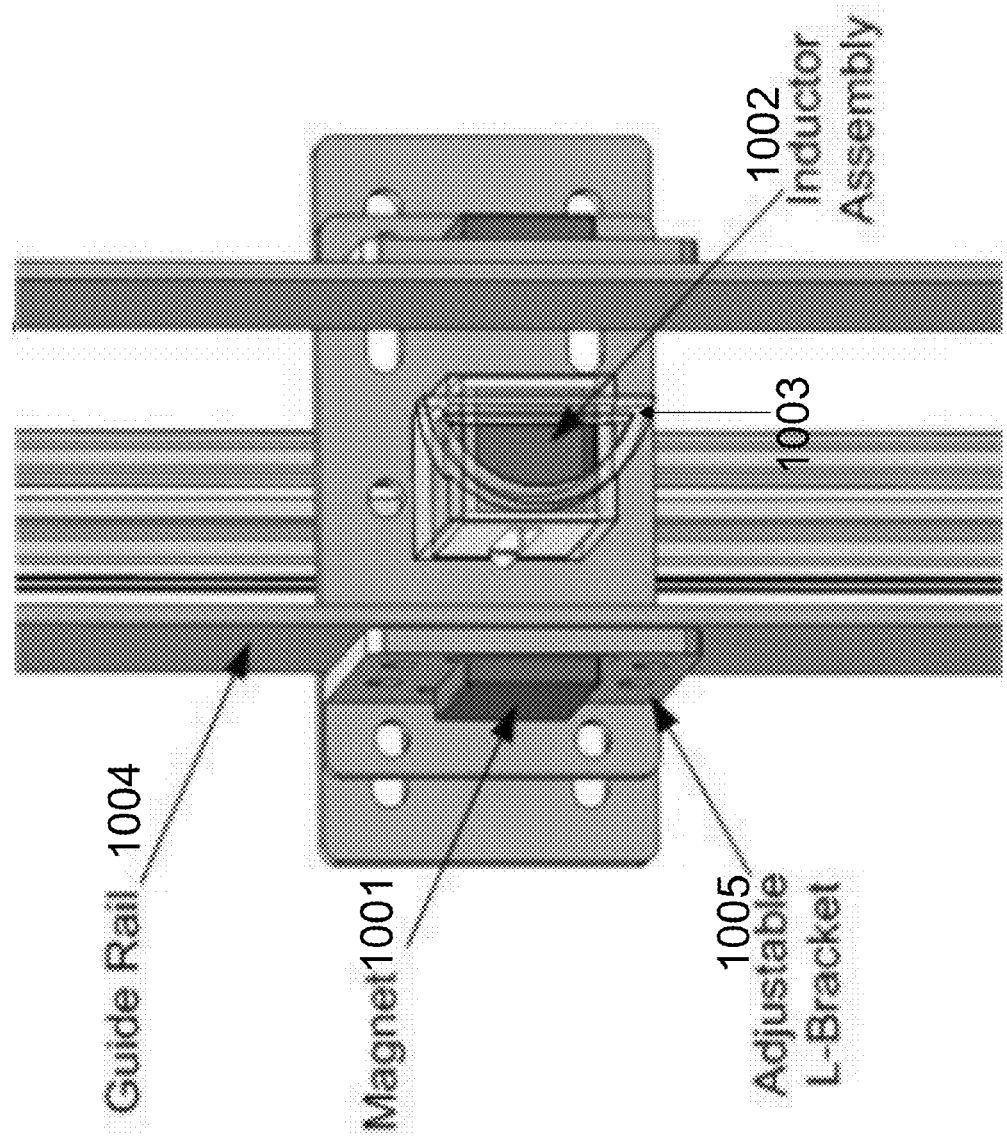
FIG. 10 is an illustration of a mounting system for the non-rotating wind energy generator according to one or more embodiments.

FIG. 10 shows a cross-sectional view of a non-rotating wind energy generator according to an embodiment of the invention. As can be seen in FIG. 10, in this embodiment, the magnets 1001 attach to the guide rails 1004 via an adjustable L-bracket 1005. In this embodiment, there is clearance between the beam 1003 and the guide rails 1004, as well as between the beam 1003 and the adjustable L-brackets 1005. In embodiments of the invention, the location of the magnets 1001 and the electromagnetic coil 1002 may be reversed. In an embodiment of the invention, 8020 aluminum framing material may be used to create the frame. Adjustable slides may be used on both sides of the assembly to hold the magnets and aluminum guide walls.

In an embodiment of the invention, the system is capable of generating approximately 30 VAC and in excess of 2.7 W of electrical power.

Figure 13:
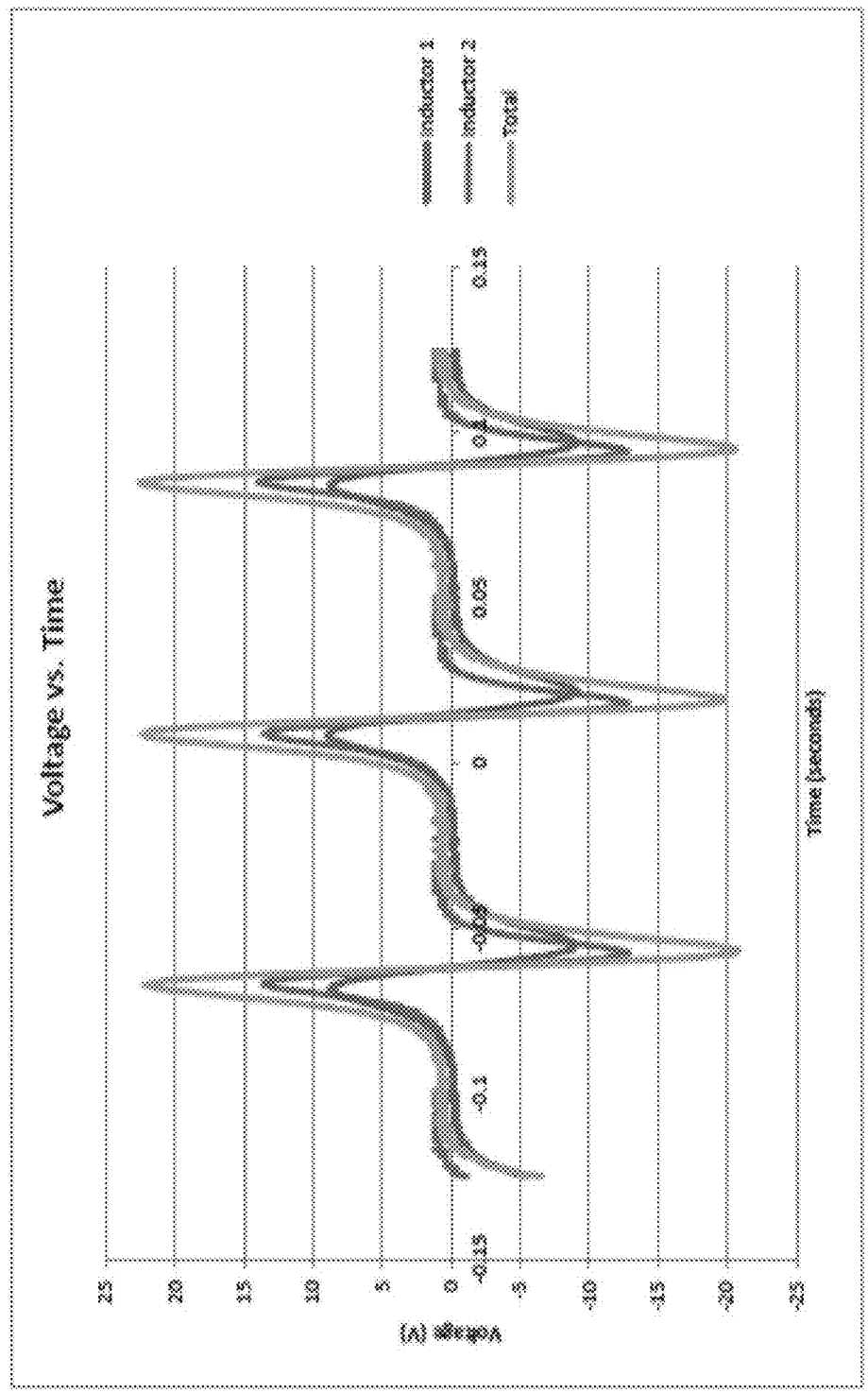
FIG. 13 is a voltage trace of a non-rotating wind energy generator according to one or more embodiments.

A prototype was constructed as shown in FIG. 4B. The prototype was set up using a large industrial fan capable of producing an average wind speed of 4 m/s. The D-beam had a length of 24 inches (exclusive of the inductor assemblies), a diameter of 2 inches, a wall thickness of ⅛ inch, and a weight of 0.5 pounds. Three sets of springs were tested to obtain a general range of spring constant in which the system would self-excite. The springs ranged in constants from 0.1 lbs/in up to 3 lbs/in. Using this approximate range of spring stiffnesses, an equivalent spring stiffness was identified to accommodate the weight of the beam and cause self-induced vibrations to occur (e.g., 0.5 lb beam self-excited with an equivalent stiffness of 0.5 lbs/in). 8020 aluminum framing material was used to create the frame. A prototype with an equivalent spring constant of 3.24 lbs/in was tested with 32 gauge wire in the inductor, which resulted in a total voltage of 22 V. The voltage trace of the assembly is shown in FIG. 13. 32 gauge wire is only rated for a maximum of 0.09 Amps of current before it will melt. Therefore, the maximum power was limited by the current limitation of the wire. At the maximum allowable current of 0.09 amps, the power output was calculated using the following: P=IV=0.09 A*22 V=1.98 W.

In an embodiment of the invention, the device may be considerably more compact and transportable than current wind energy generators. Its compact design makes the embodiment inherently less susceptible to airborne threats (birds, flying debris, etc.) that can easily damage the spinning blades of wind turbine generator. In an embodiment of the invention, the unique design of the generator makes it more useful in a variety of applications. Its portable and easily collapsible design makes it practical for mobile charging of electronic devices (for consumer and military purposes). Its compact, low profile form factor makes it ideal for larger scale applications (e.g. wind farms, urban/suburban settings) where visually obtrusive wind turbines are unsuitable. Additionally, in an embodiment of the invention, the moving parts of the embodiment are contained within the body of the system and pose less of a safety hazard than large, rotating blades that could be harmful to humans and animals. The potential applications for embodiments of the invention are essentially limitless.

Embodiments of the invention convert kinetic energy of an oscillating bluff body (e.g., a beam driven by fluid flow phenomena) into electrical energy via electromagnetic inductor.

In embodiments of the invention, coils of wire are located at the ends of an oscillating bluff body (e.g., beam) and the flat face of the wire coils is parallel to the front flat face of the beam. The central axis of the coil can be perpendicular to the central axis of the beam.

Figure 14:
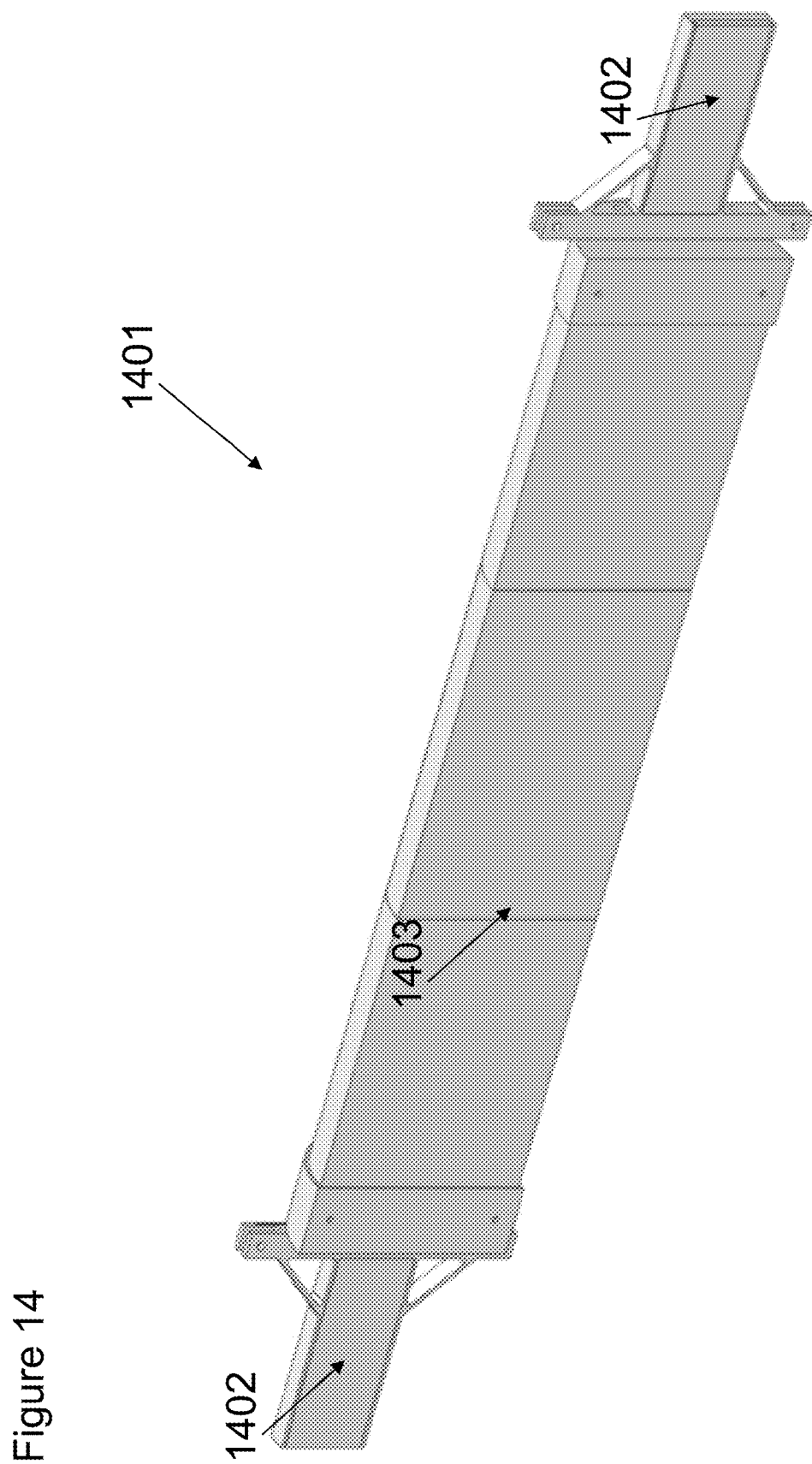
FIG. 14 is a perspective illustration of a beam according to one or more embodiments.

FIG. 14 exemplifies a further embodiment of a beam, such as the beam depicted in FIG. 5, where the flat face of the coil of wire is parallel to the front flat face of the beam. FIG. 14 shows the beam 1401 according to an embodiment of the invention. In this embodiment the coils of wire 1402 are attached to each end of the beam 1403. The coils of wire 1402 can be located at the ends of the moving beam such that the flat face of the coil of wire 1402 is parallel to the front flat face of the beam 1403. The central axis of the coil can be perpendicular to the central axis of the beam. FIG. 26C depicts a similar embodiment to FIG. 14 and provides a view of the coils of wire 2602.

In embodiments of the invention, coils of wire attached to an oscillating bluff body can pass through a single pair of magnets that have poles (North, South) that face each other.

Figure 16:
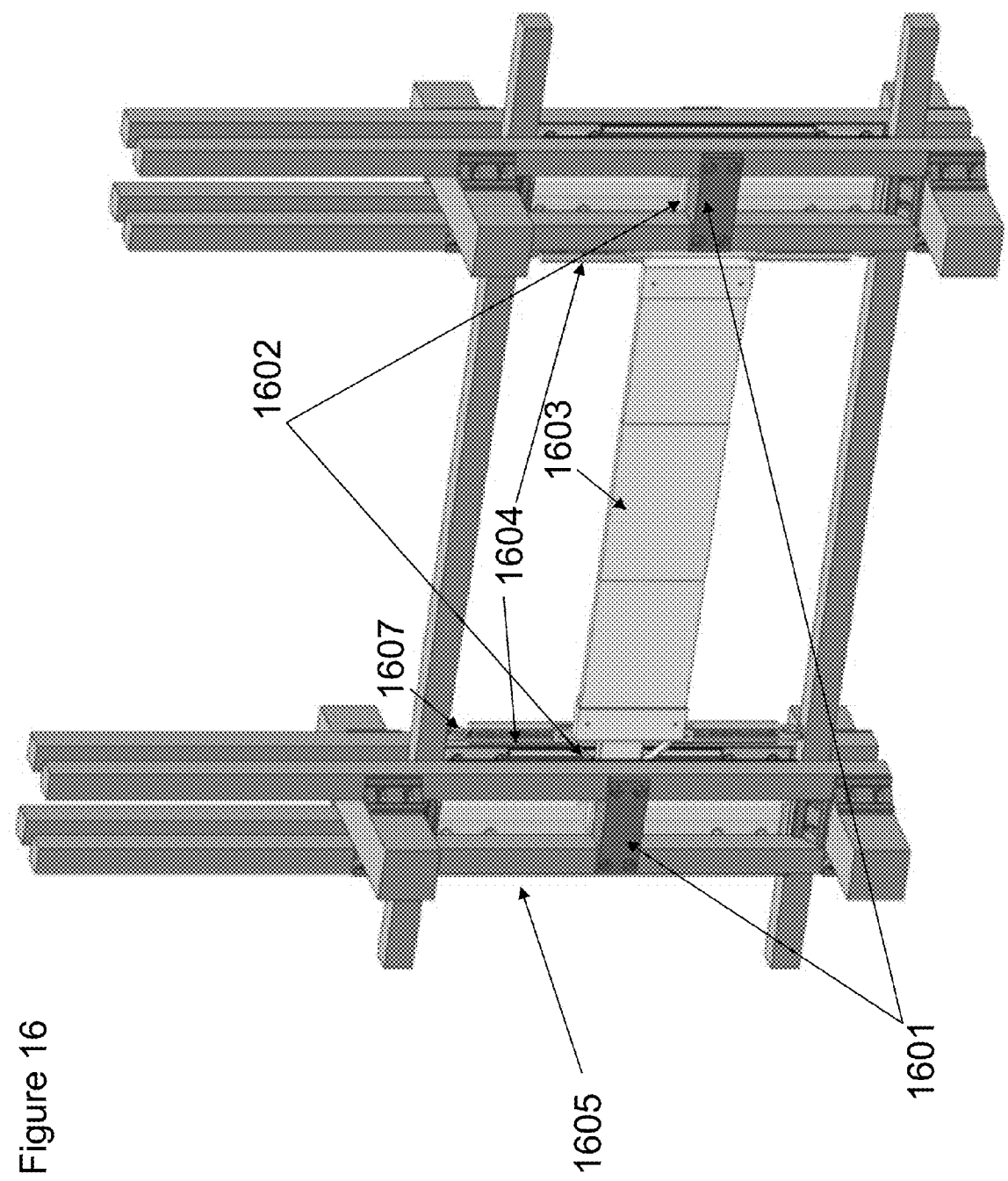
FIG. 16 provides a perspective view of a non-rotating wind energy generator according to an embodiment of the invention.

FIG. 16 shows a non-rotating wind energy generator according to an embodiment of the present invention where the beam of FIG. 14 is used. In this embodiment, there are magnets 1601, coil of wire 1602, a beam 1603, springs 1604, and a frame 1605. In this embodiment, the beam 1603 and the frame 1605 each have four connection points 1607. Coil of wire 1602 located at the ends of the moving beam 1603 pass through a single pair of parallel magnets 1601 on each end of the system frame 1605.

In embodiments of the invention, multiple pairs of magnets can be positioned in specific arrangements. Such embodiments can have improved kinetic energy to electrical energy conversion. For example, multiple pairs of magnets can be positioned above and below other pairs of magnets such that as the bluff body (e.g., a beam) carrying the coils travels up and down, the coils pass through several magnetic fields generated by the parallel magnets. In an embodiment of the invention, the relative polarity of each stacked magnet pair is reversed (North, South, North, South, etc.). In at least one embodiment of the invention, the change in magnetic flux direction that the coil of wire experiences as the bluff body (e.g., beam) oscillates has a significant improvement in electrical energy conversion/generator power output. A gap of any distance between adjacent pairs of magnets may or may not be present.

Figure 17:
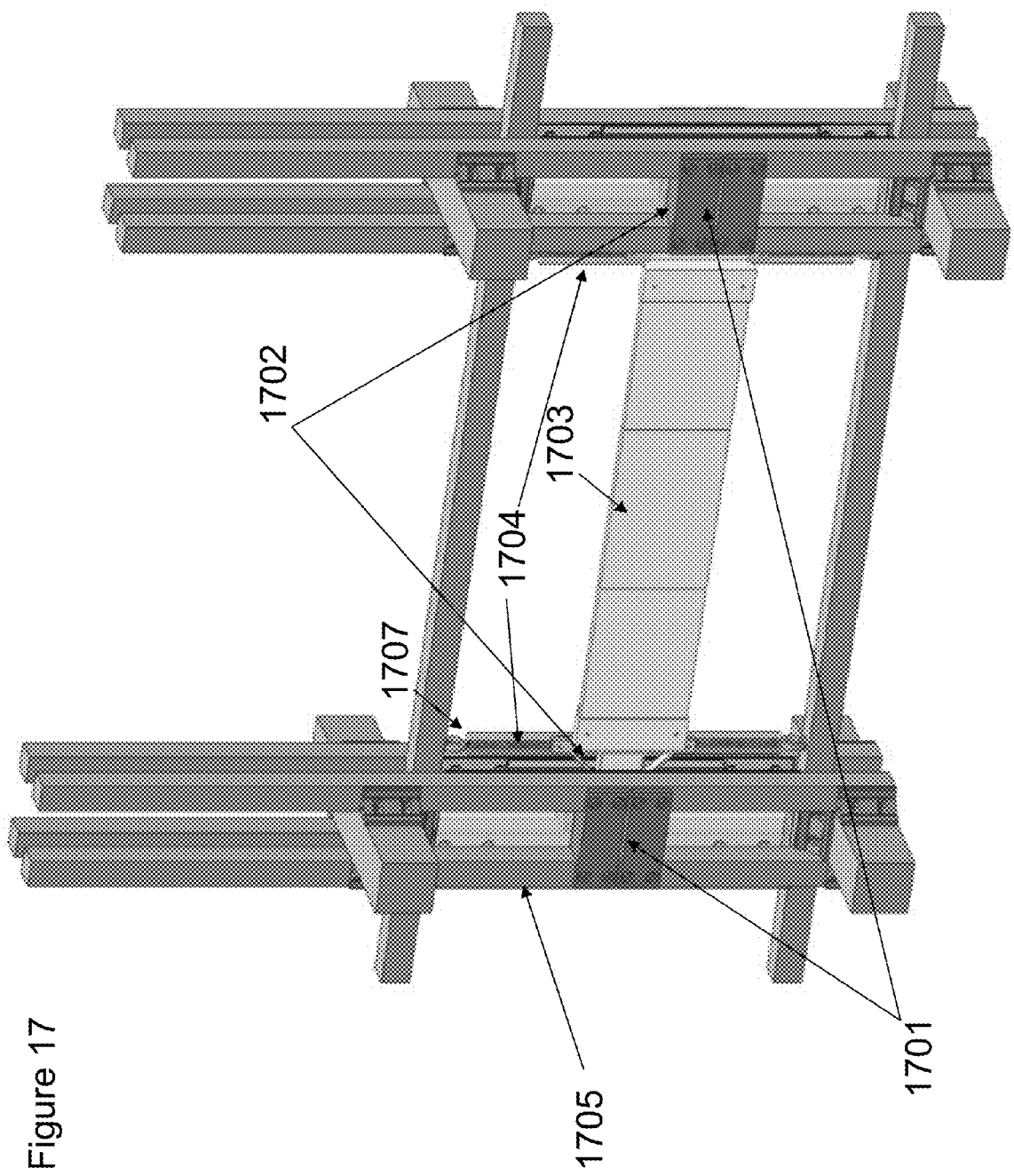
FIG. 17 provides a perspective view of a non-rotating wind energy generator according to an embodiment of the invention.

FIG. 17 shows a non-rotating wind energy generator according to an embodiment of the present invention in which there are multiple pairs of magnets that are stacked on top of each other and in which the polarities can be switched. In this embodiment, there are magnets 1701, coils of wire 1702, a beam 1703, springs 1704, and a frame 1705. In this embodiment, the beam 1703 and the frame 1605 each have four connection points 1707. In this embodiment, there are multiple pairs of magnets 1701, comprising first magnets 1701a and second magnets 1701b, that are stacked on top of each other. As the beam 1703 carrying the coils of wire 1702 travels up and down, the coils of wire 1702 pass through several magnetic fields generated by the parallel magnets 1701. In embodiments of the invention, the polarity of the stacked magnets 1701 can be switched (e.g., North, South, North, etc.). In further embodiments of the invention, the polarity of the stacked magnets 1701 is not switched. Further embodiments of the invention can also include a combination of stacked magnets 1701 where the polarity is switched and stacked magnets 1701 that are not switched. In at least one embodiment of the invention, utilizing stacked magnets 1701 where the polarity is switched can improve power output.

Figure 23:
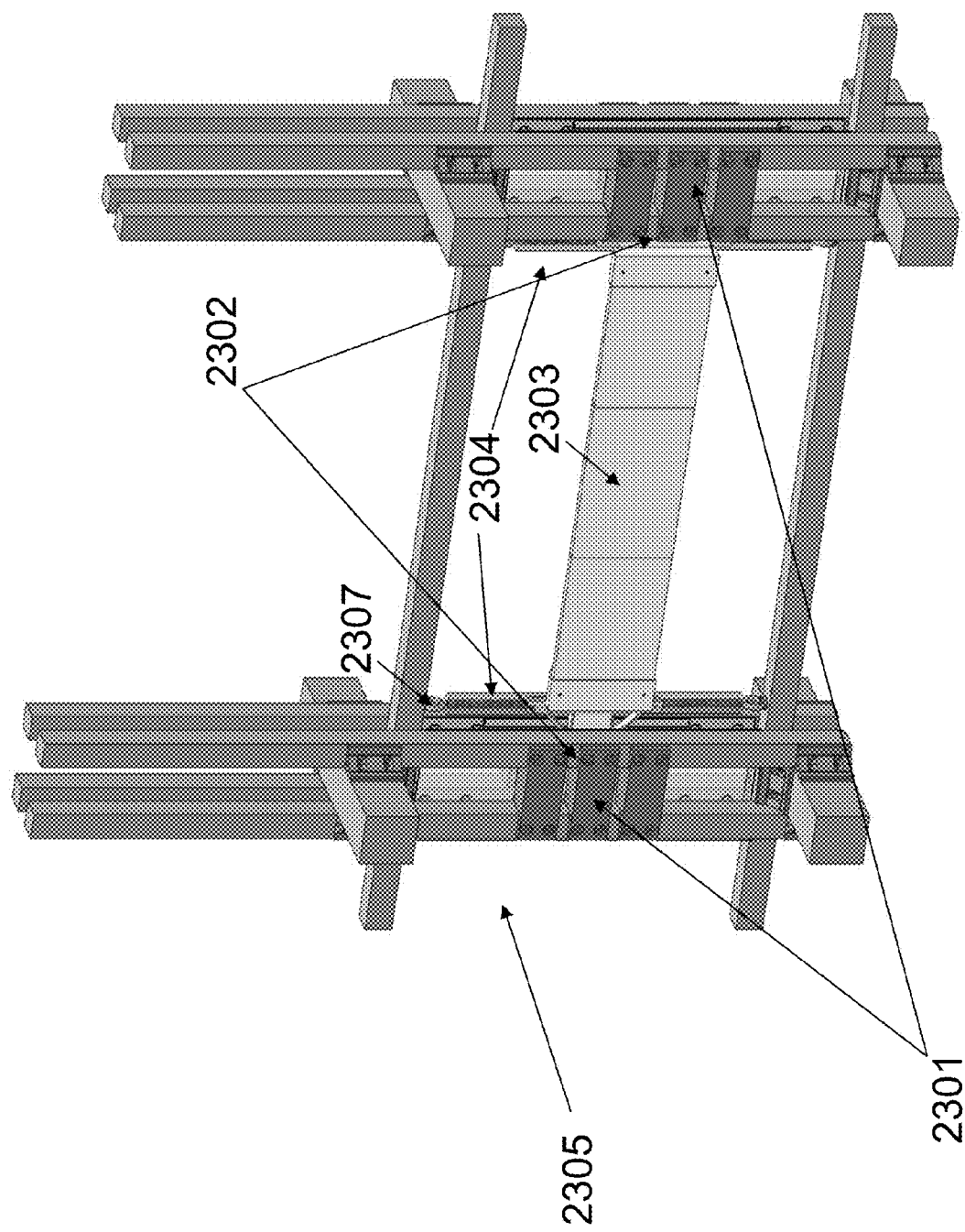
FIG. 23 provides a perspective view of a non-rotating wind energy generator according to an embodiment of the invention.

FIG. 23 shows a non-rotating wind energy generator according to an additional embodiment of the present invention in which there are multiple pairs of magnets that are stacked on top of each other. In this embodiment, there are magnets 2301, coils of wire 2302, a beam 2303, springs 2304, and a frame 2305. In this embodiment, the beam 2303 and the frame 2305 each have four connection points 2307. In this embodiment, there are multiple pairs of magnets 2301 that are stacked on top of each other. As the beam 2303 carrying the coils of wire 2302 travels up and down, the coils of wire 2302 pass through several magnetic fields generated by the parallel magnets 2301.

Figure 24:
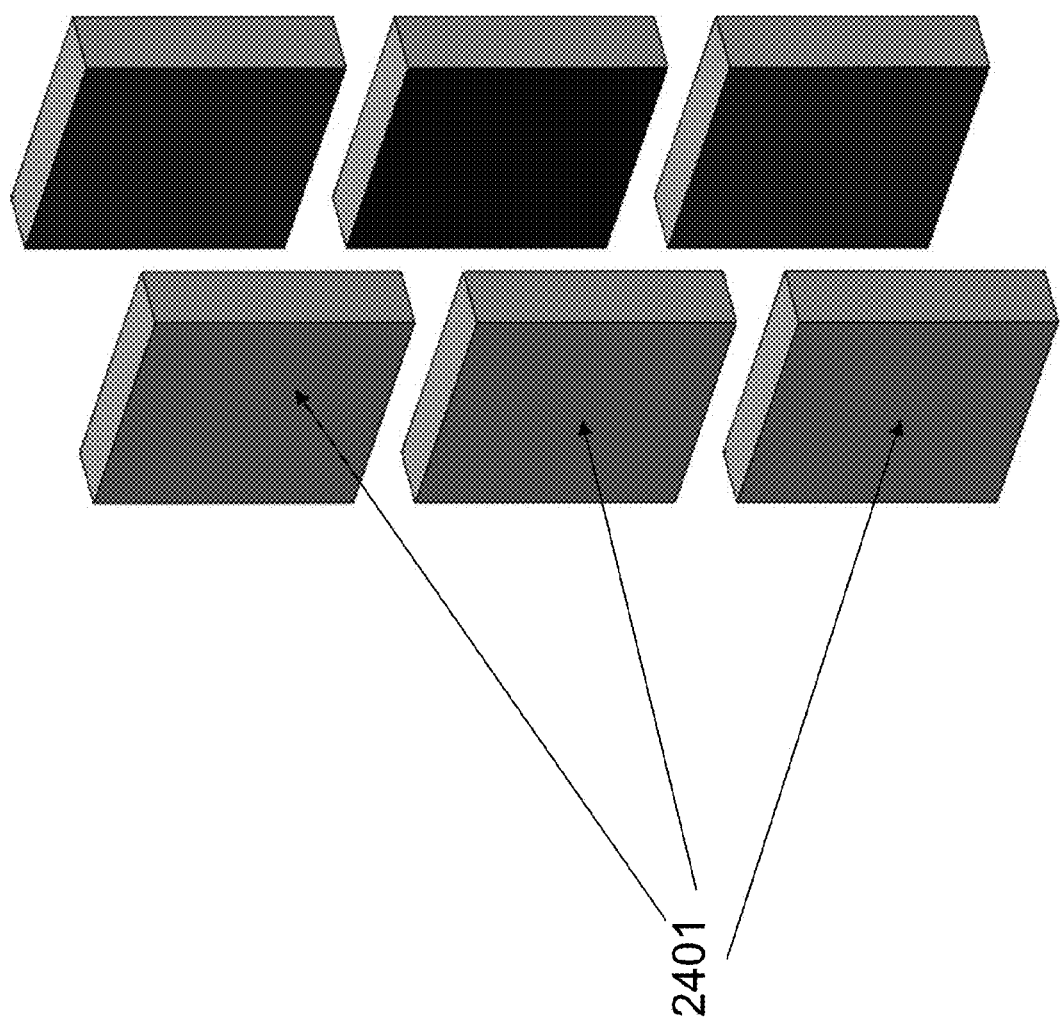
FIG. 24 shows magnets according to an embodiment of the invention.
Figure 25:
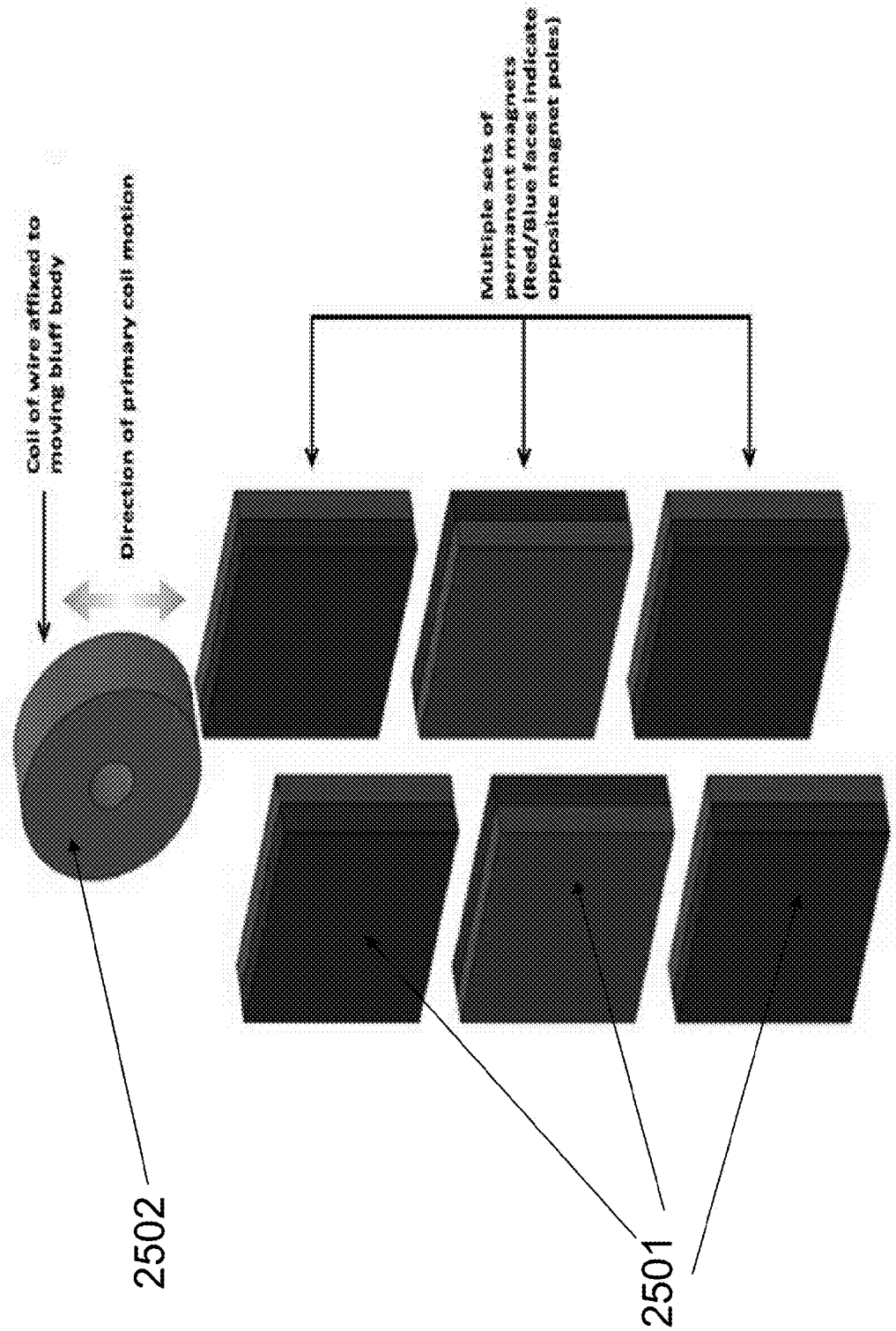
FIG. 25 shows magnets and a coil according to an embodiment of the invention.

FIGS. 24-26 further illustrate the use of multiple pairs of magnets that are stacked on top of each other and in which the polarities can be switched according to an aspect of the invention.

FIG. 24 shows magnets according an embodiment of the invention. In these embodiments, there can be multiple pairs of magnets 2401.

FIG. 25 shows magnets and a coil according to an embodiment of the invention. In this embodiment, the coil of wire 2502 attached to a moving bluff body (e.g., beam) can pass through multiple sets of magnets 2501.

Figure 26A:
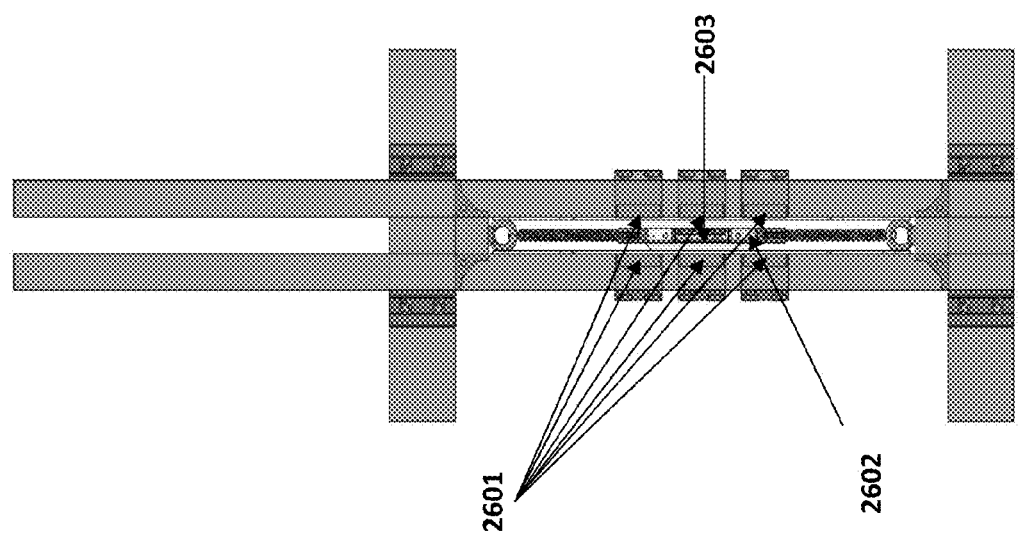
FIGS. 26A, 26B, and 26C show magnets and coils according to an embodiment of the invention.
Figure 26B:
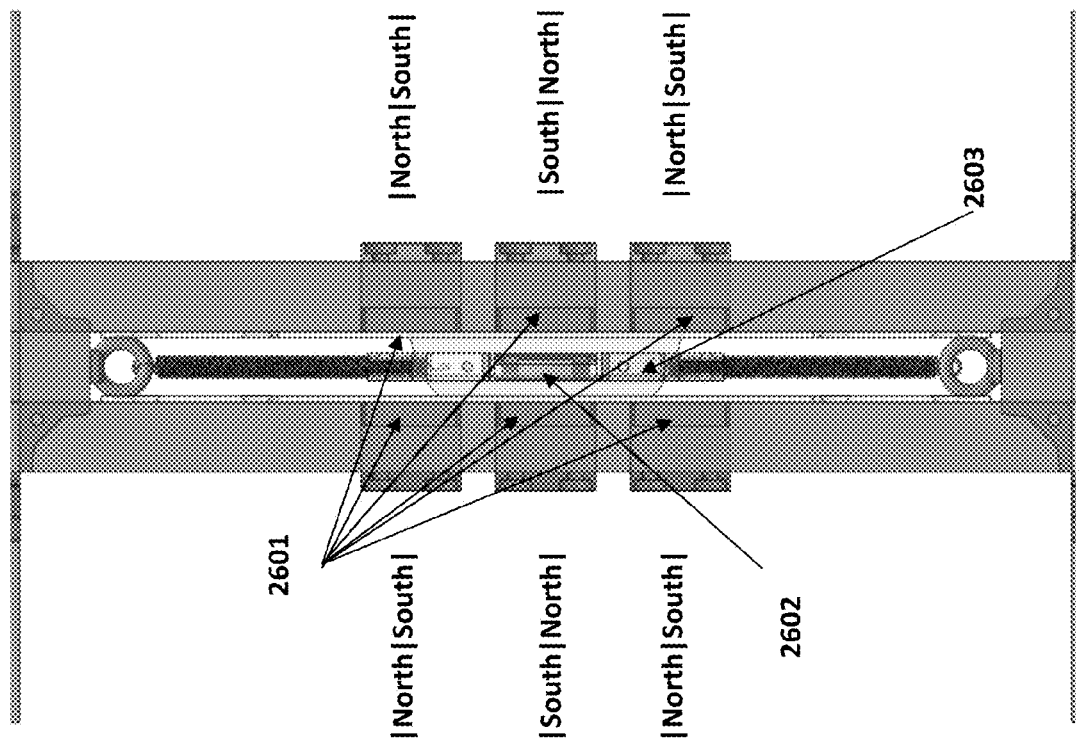
Figure 26C:
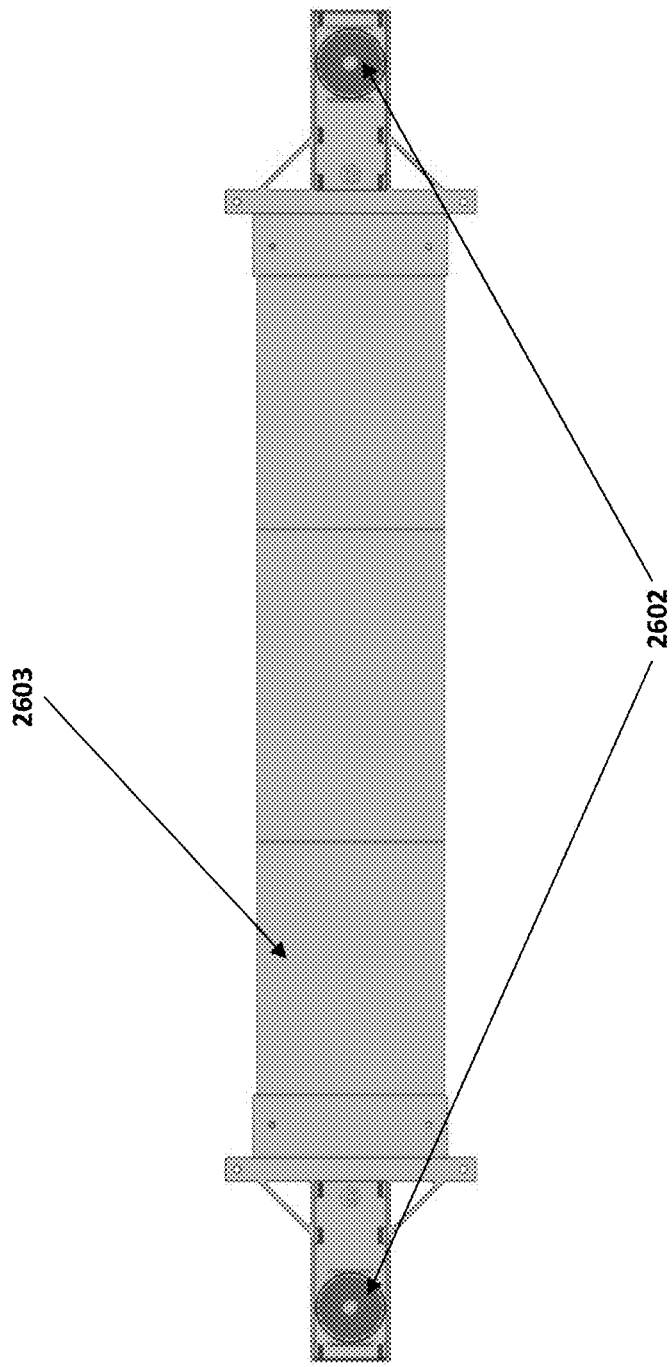

FIGS. 26A, 26B, and 26C show magnets and coils according to an embodiment of the invention. In this embodiment, as shown in FIG. 26A, the coils of wire 2602 attached to a moving bluff body (e.g., beam) 2603 can pass through multiple sets of magnets 2601. FIG. 26B shows a further view where the coils of wire 2602 attached to a moving bluff body (e.g., beam) 2603 can pass through multiple sets of magnets 2601 and where the magnetic polarity of the magnets 2601 are indicated with the notation |Magnet Polarity Orientation| (e.g., "|North|South|" or "|South-|North|"). FIG. 26C shows a further view of bluff body 2603 and the coils of wire 2602.

In alternate embodiments of the invention, the coil of wire can be located at the ends of oscillating bluff body (e.g., beam) with their flat face perpendicular to the front face of the beam. The central axis of the coil can be parallel to the central axis of the beam. In at least one such embodiment, lateral motion of the bluff body caused by excessive wind forces acting on the front face of the beam will not cause the beam to come in contact with the magnet holders, guide plate, or any other surface. In an embodiment of the invention, the coils can be mounted on extended "U-shape" mounting brackets to permit them to pass through one or several sets of parallel magnets. The "U-shape" mounting bracket can position the center of mass of the coils of wire in the same plane as the center of mass of the beam. In certain embodiments, this can provide improved stability.

Figure 15:
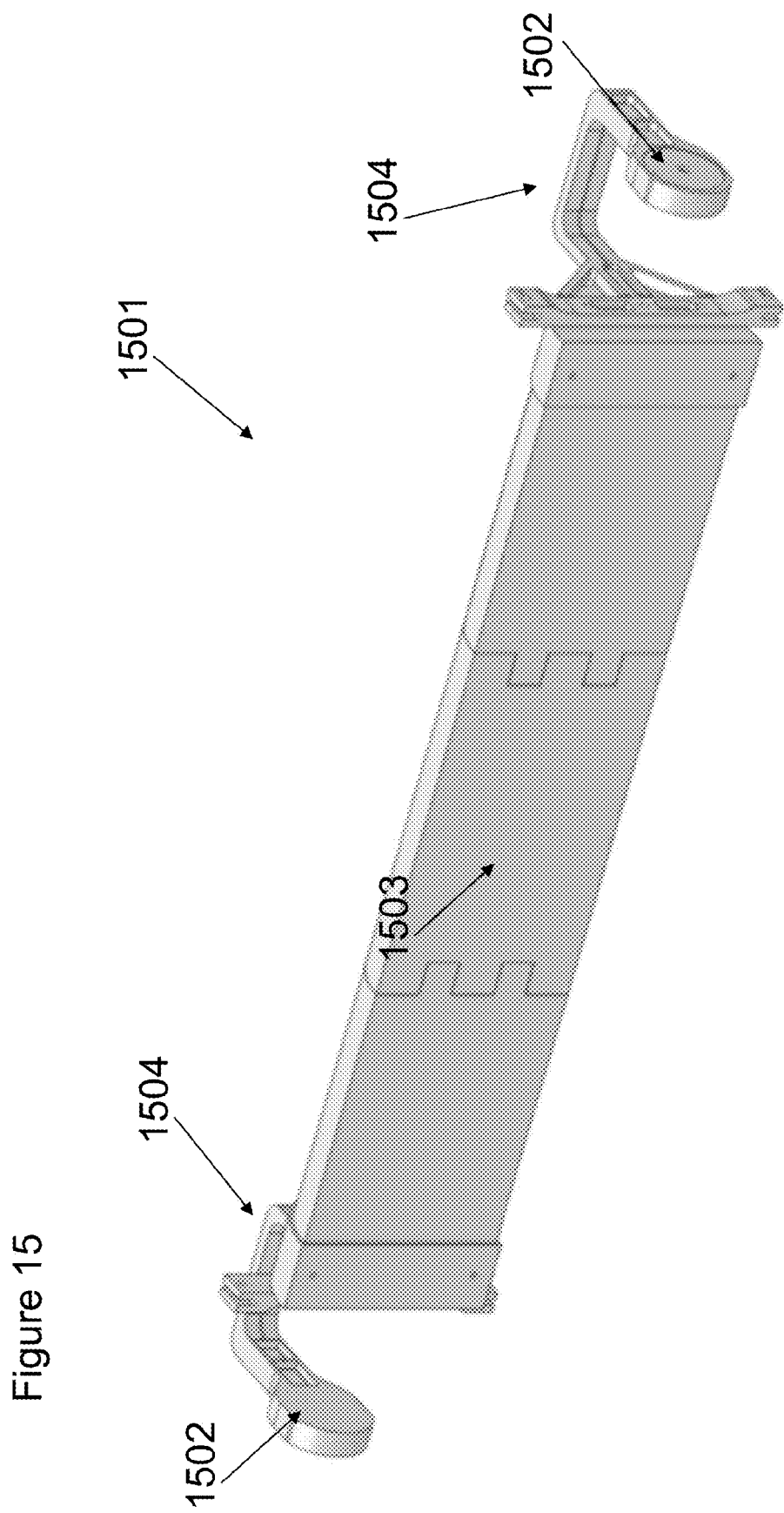
FIG. 15 is a perspective illustration of a beam according to one or more embodiments.

FIG. 15 shows the beam 1501 in an alternate embodiment of the invention in which the coil of wire has a flat face perpendicular to a front face of a beam and the central axis of the coil of wire is parallel to the central axis of the beam. In this embodiment the coil of wire 1502 are attached to each end of the beam 1503. The coil of wire 1502 can be located at the ends of the moving beam with their flat face perpendicular to the front face of the beam 1503. The central axis of the coil of wire 1502 can be parallel to the central axis of the beam 1503. The coil of wire 1502 can be mounted on extended "U-shape" mounting brackets 1504. The coil of wire 1502 can pass through one or more sets of parallel magnets.

Figure 20:
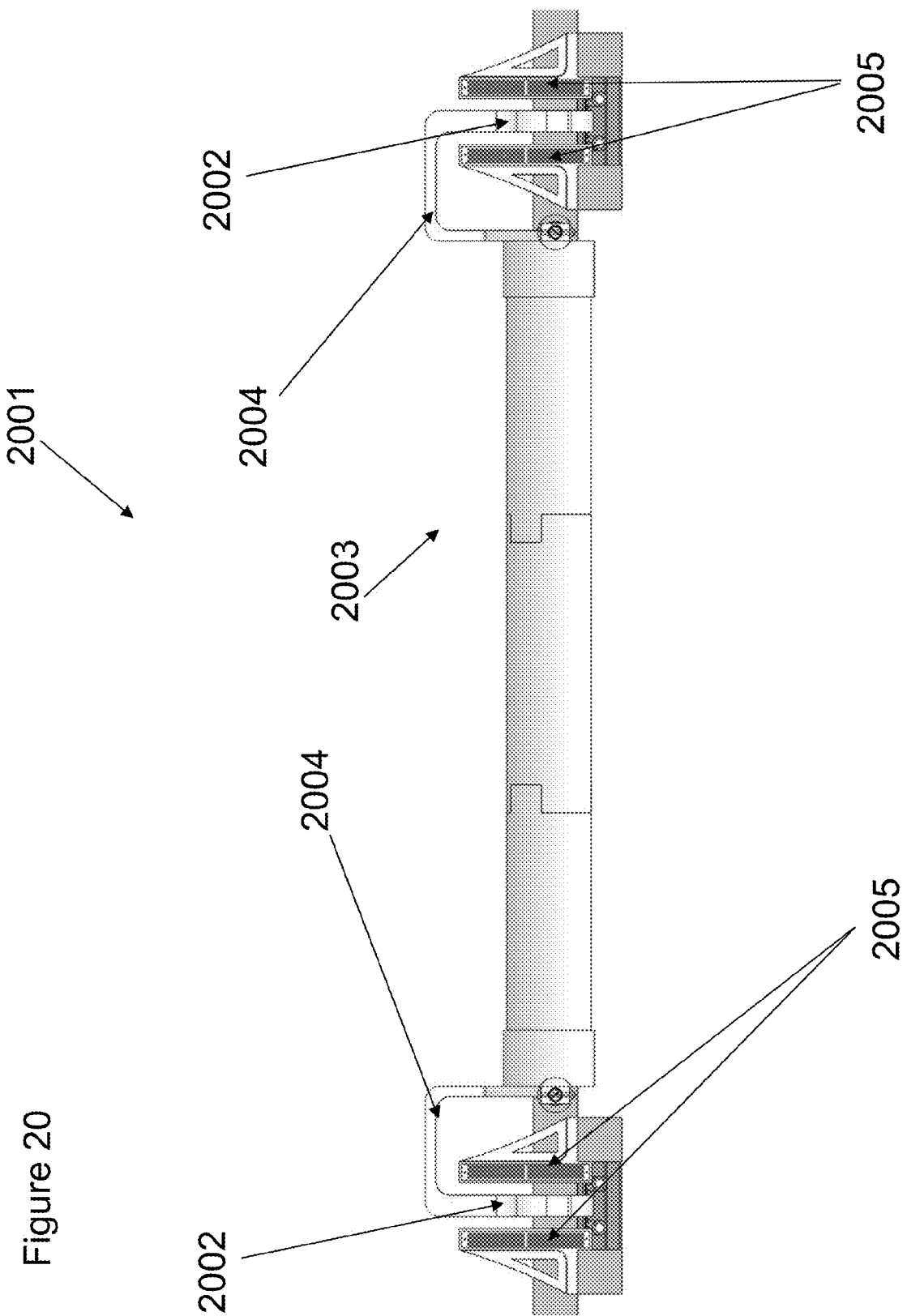
FIG. 20 provides a view of a non-rotating wind energy generator according to an embodiment of the invention.
Figure 21:
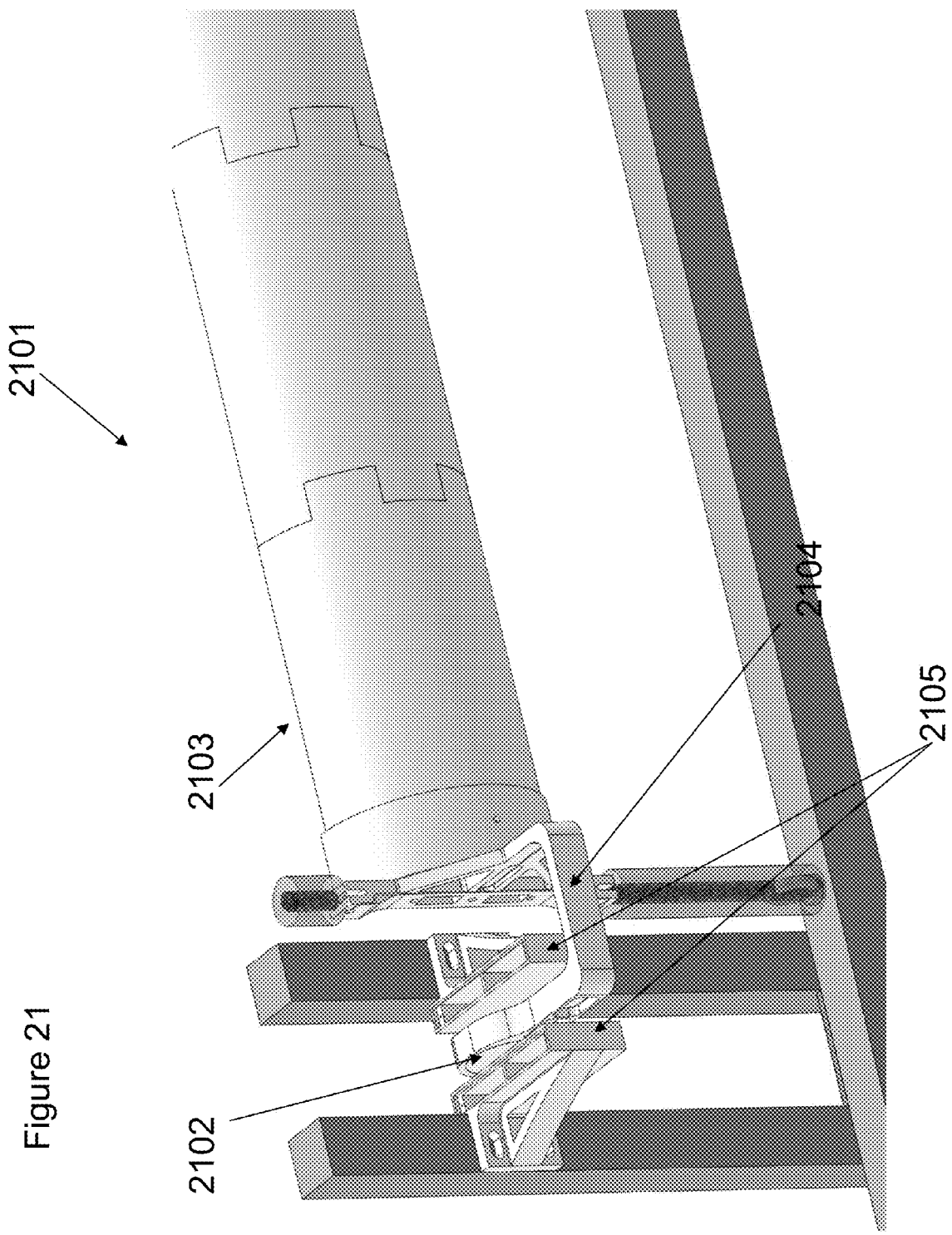
FIG. 21 provides a view of a non-rotating wind energy generator according to an embodiment of the invention.
Figure 22:
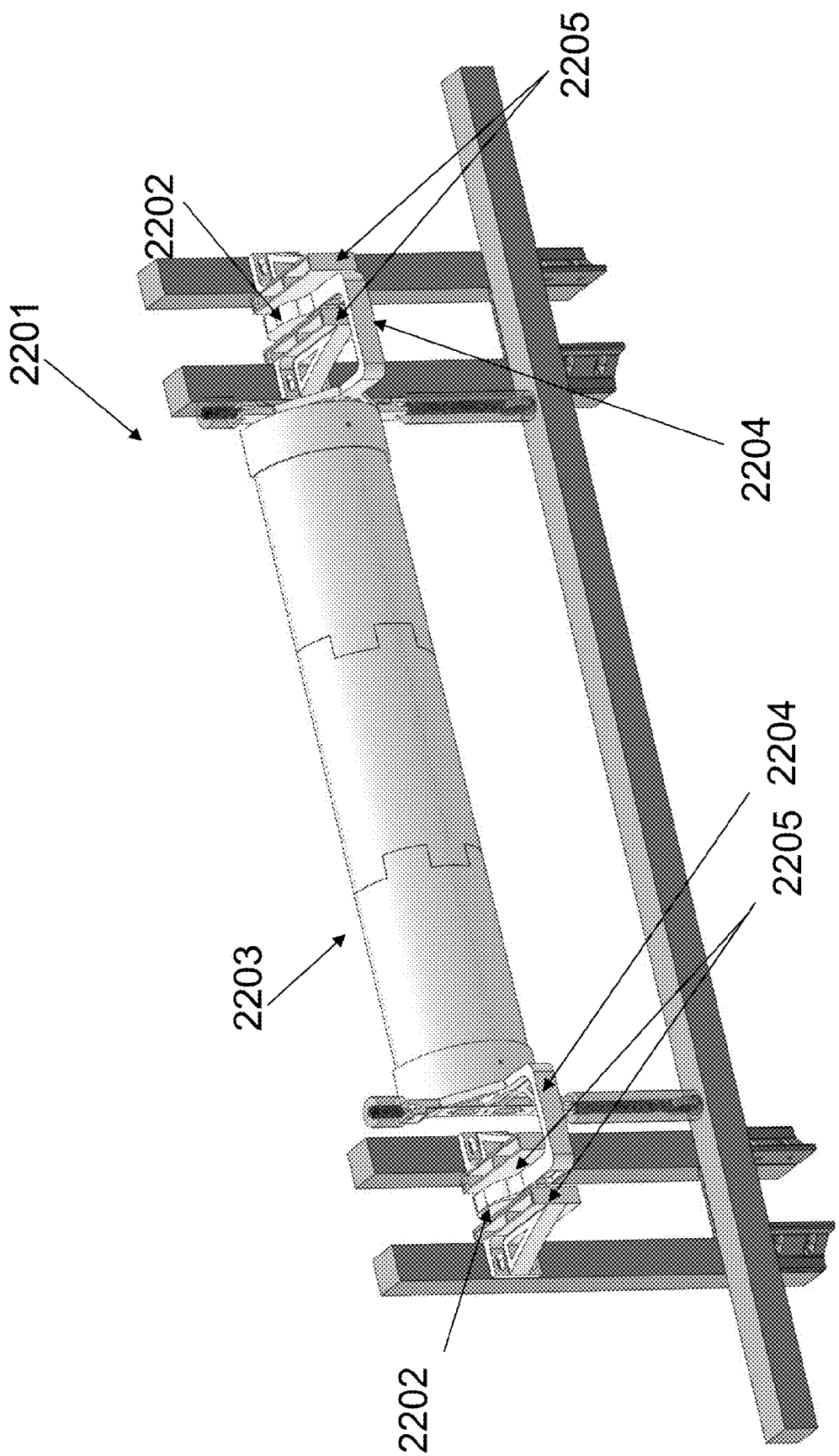
FIG. 22 provides a view of a non-rotating wind energy generator according to an embodiment of the invention.

FIGS. 20-22 provide further views of alternate embodiments of the invention in which the coil of wire has a flat face perpendicular to a front face of a beam and the central axis of the coil of wire is parallel to the central axis of the beam.

FIG. 20 provides a cross-sectional top-view of a non-rotating wind energy generator according to an alternate embodiment of the invention. In this embodiment, the coil of wire 2002 is attached to each end of the beam 2003. The coils of wire 2002 can be located at the ends of the moving beam with their flat face perpendicular to the front face of the beam 2003. The central axis of the coil of wire 2002 can be parallel to the central axis of the beam 2003. The coils of wire 2002 can be mounted on extended "U-shape" mounting brackets 2004. The coil of wire 2002 can pass through one or more sets of parallel magnets 2005.

FIG. 21 provides a view of a non-rotating wind energy generator according to an alternate embodiment of the invention. In this embodiment, the coil of wire 2102 is attached to each end of the beam 2103. The coils of wire 2102 can be located at the ends of the moving beam with their flat face perpendicular to the front face of the beam 2103. The central axis of the coil of wire 2102 can be parallel to the central axis of the beam 2103. The coil of wire 2102 can be mounted on extended "U-shape" mounting brackets 2104. The coil of wire 2102 can pass through one or more sets of parallel magnets 2105.

FIG. 22 provides a view of a non-rotating wind energy generator according to an alternate embodiment of the invention. In this embodiment, the coils of wire 2202 are attached to each end of the beam 2203. The coil of wire 2202 can be located at the ends of the moving beam with their flat face perpendicular to the front face of the beam 2203. The central axis of the coil of wire 2202 can be parallel to the central axis of the beam 2203. The coil of wire 2202 can be mounted on extended "U-shape" mounting brackets 2204. The coil of wire 2202 can pass through one or more sets of parallel magnets 2205.

In further alternate embodiments, the coils can be extended beyond the front face of the bluff body (e.g., beam). In these further alternate embodiments, the center of mass of the coils is not in the same plane as the center of mass of the beam.

Figure 18:
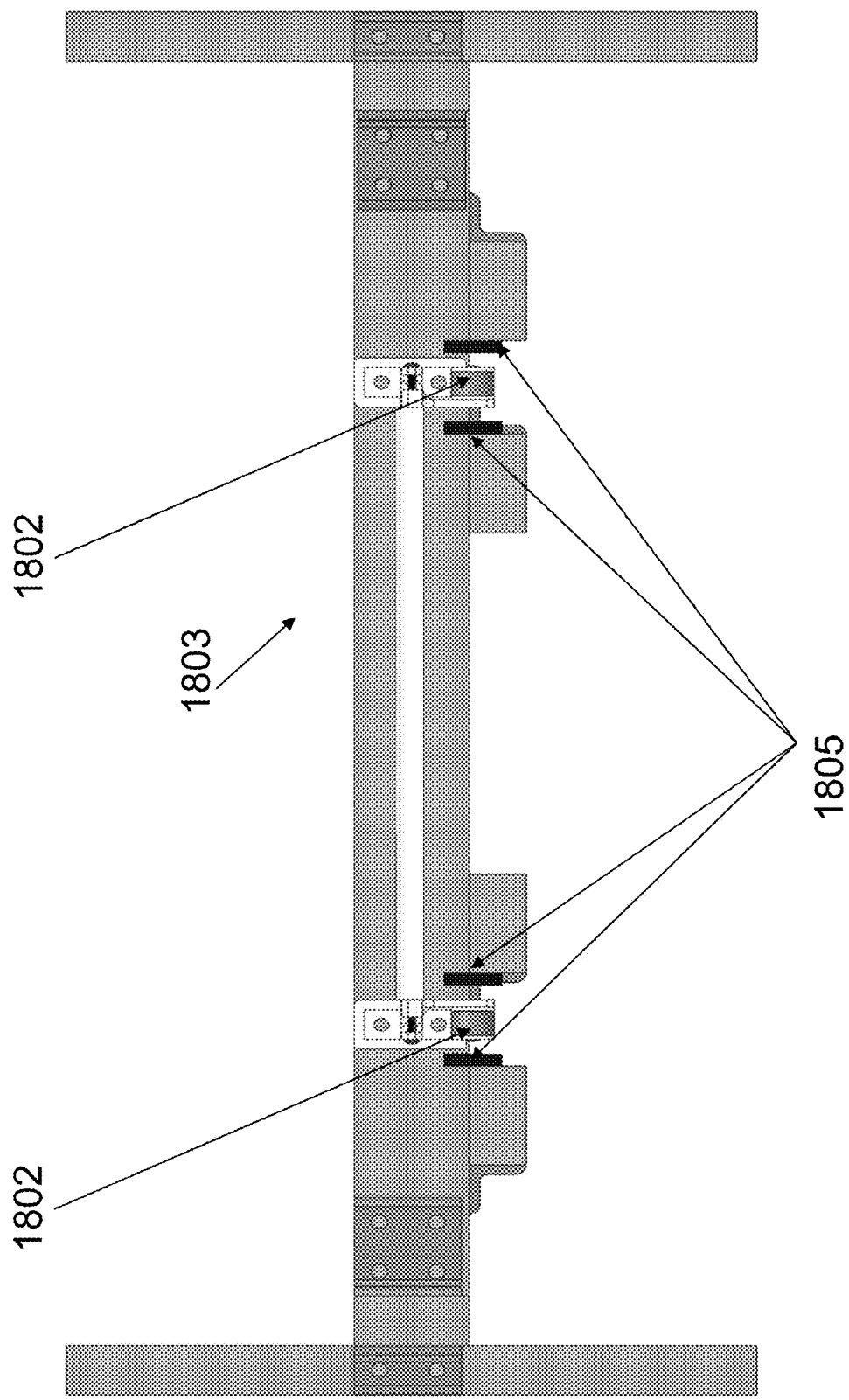
FIG. 18 provides a view of a non-rotating wind energy generator according to an embodiment of the invention.

FIG. 18 provides a cross-sectional top-view of a non-rotating wind energy generator according to a further alternate embodiment of the invention in which the coil of wire has a flat face perpendicular to a front face of a beam and the coils extend beyond the front face of the beam. In this embodiment, there is a coil of wire 1802 and a beam 1803. The coil of wire 1802 can pass through one or more sets of parallel magnets 1805.

Figure 19:
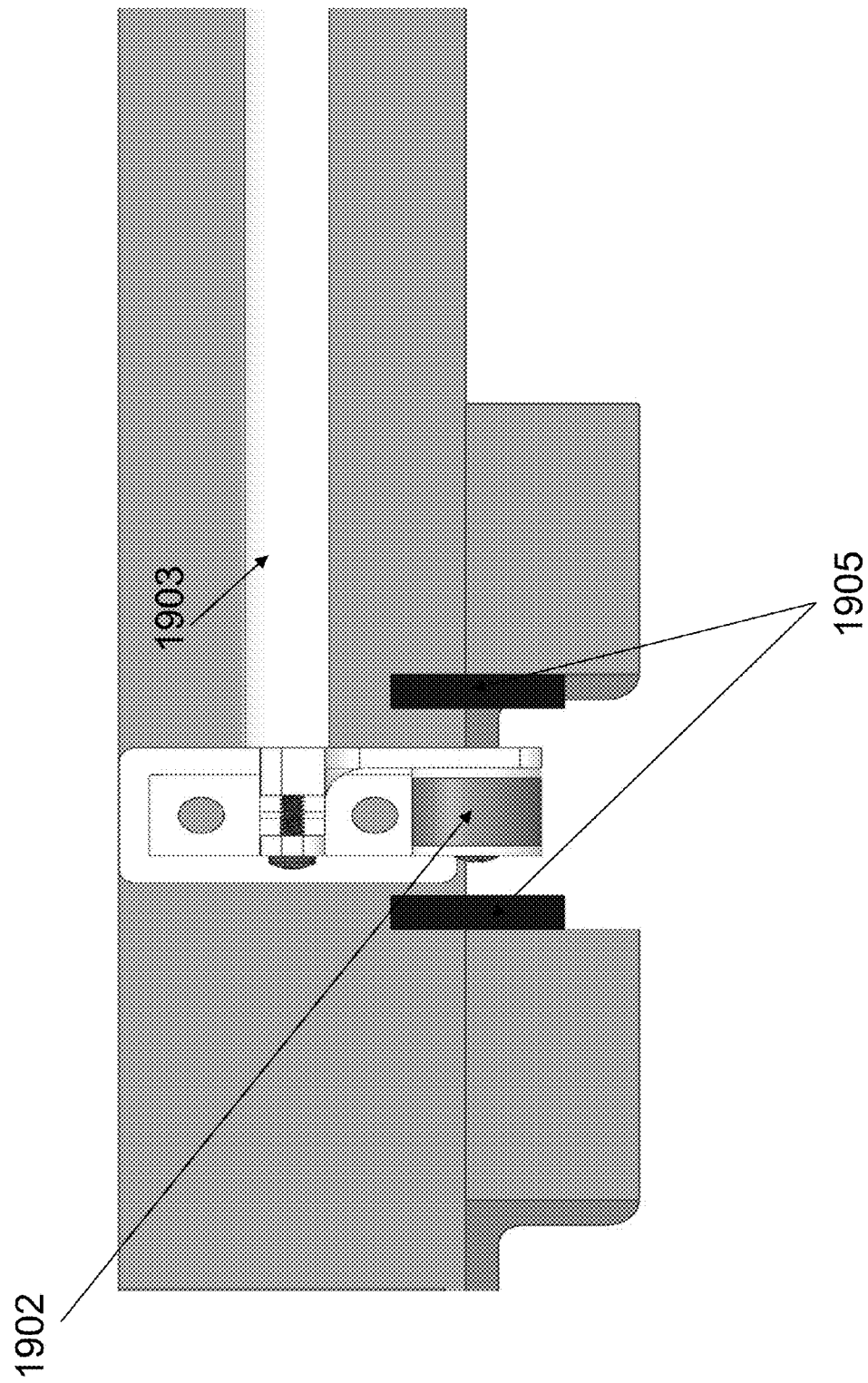
FIG. 19 provides a view of a non-rotating wind energy generator according to an embodiment of the invention.

FIG. 19 provides an additional cross-sectional top-view of a non-rotating wind energy generator according to a further alternate embodiment of the invention in which the coil of wire has a flat face perpendicular to a front face of a beam and the coils extend beyond the front face of the beam. In this embodiment, there is a coil of wire 1902 and a beam 1903. The coil of wire 1902 can pass through one or more sets of parallel magnets 1905.

FIGS. 27-30 depict additional alternate embodiments of the invention in which the magnets and coils of wire can be inset in the frame and the beam. In these embodiments, lateral beam motion perpendicular to the flat face of the beam can avoid causing frictional contact with any surface, or alternatively, can reduce frictional contact with the surface.

Figure 27A:
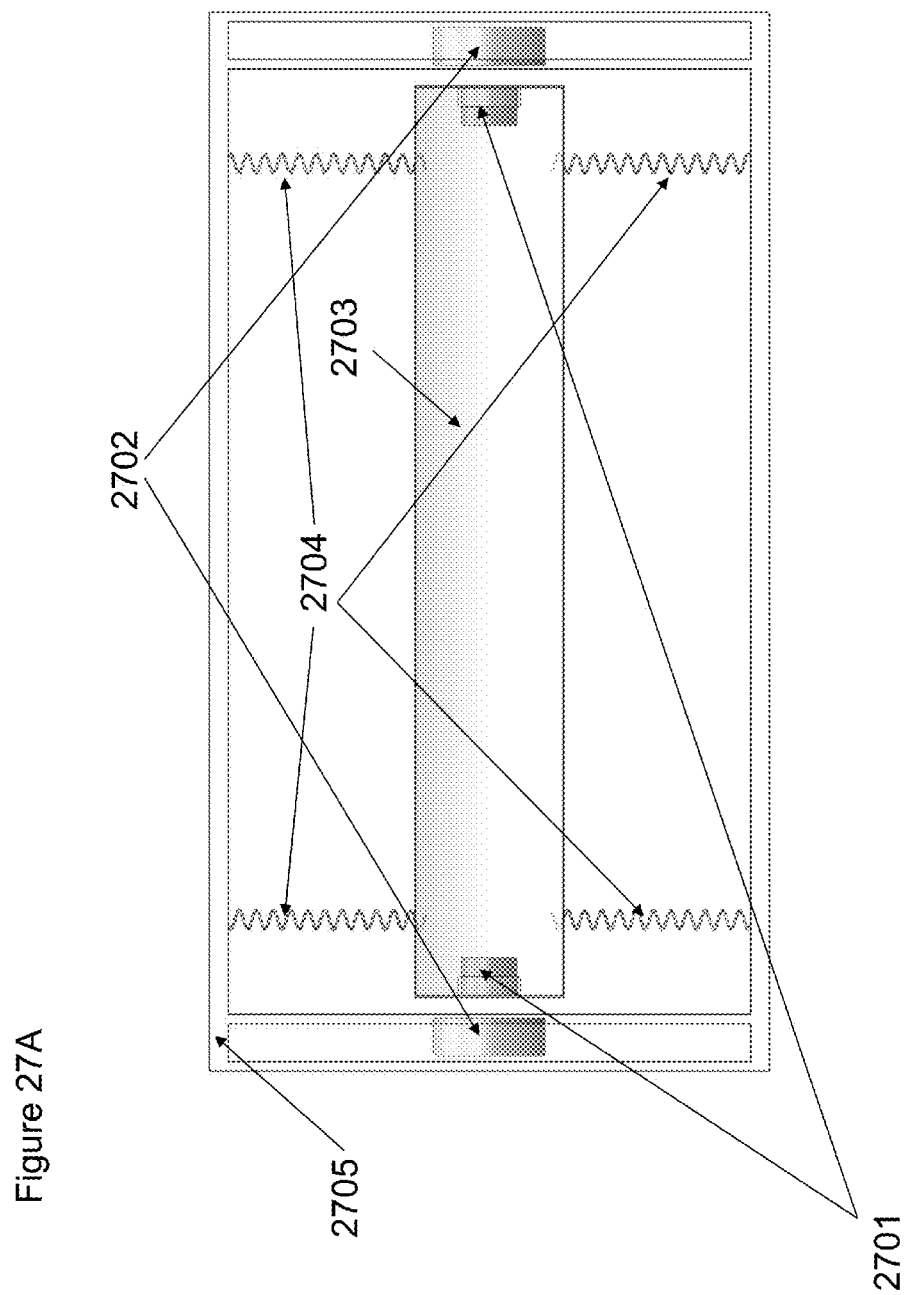
FIGS. 27A and 27B provide perspective views of a non-rotating wind energy generator according to an embodiment of the invention.
Figure 27B:
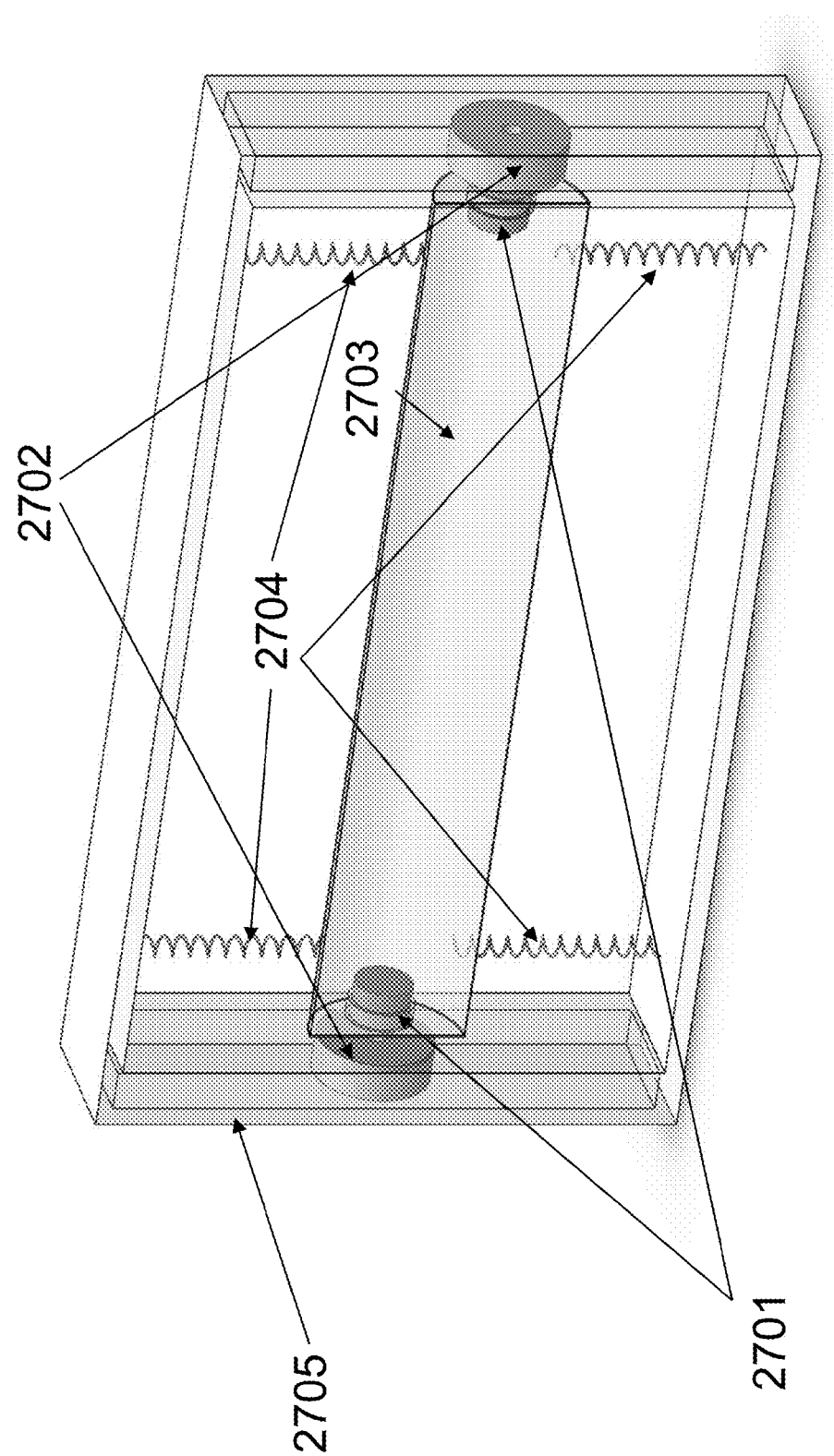

FIGS. 27A and 27B provide perspective views of a non-rotating wind energy generator according to an embodiment of the invention. In this embodiment, there are magnets 2701, coils of wire 2702, a beam 2703, springs 2704, and a frame 2705. In this embodiment the coils of wire 2702 are attached to stationary members of the frame 2705. The coils of wire 2702 can be located with their flat face perpendicular to the front face of a beam 2703. In this embodiment, the permanent magnets 2701 are mounted to the beam 2703. In this embodiment, the magnets 2701 are positioned close to the flat face of the coils of wire 2702 such that the magnetic field lines periodically pass through the coils of wire 2702 as the beam 2703 oscillates. In this embodiment, lateral beam motion perpendicular to the flat face of the beam 2703 can avoid causing frictional contact with any surface. Alternatively, in this embodiment, lateral beam motion perpendicular to the flat face of the beam 2703 can reduce frictional contact with a surface.

Figure 28A:
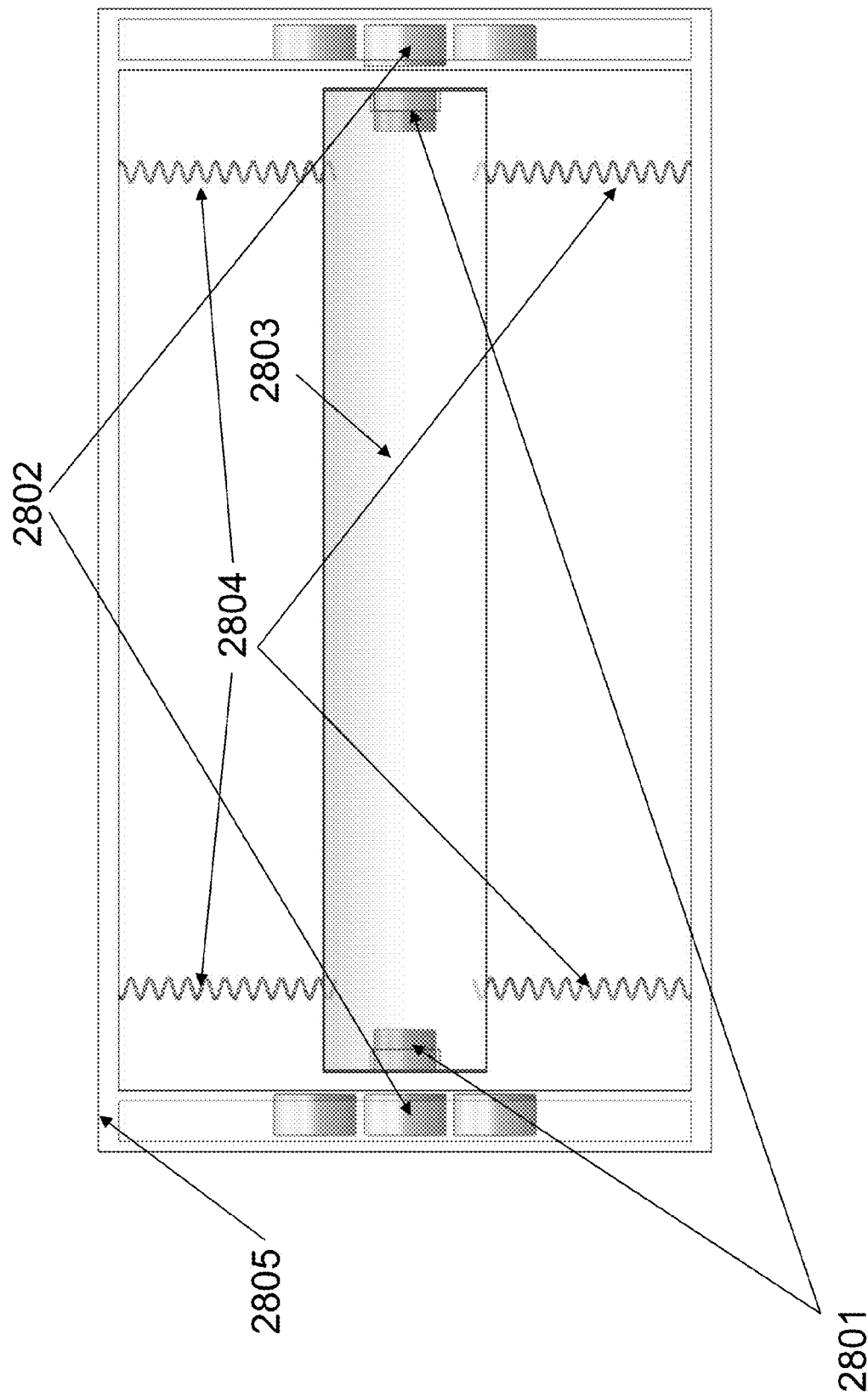
FIGS. 28A and 28B provide perspective views of a non-rotating wind energy generator according to an embodiment of the invention.
Figure 28B:
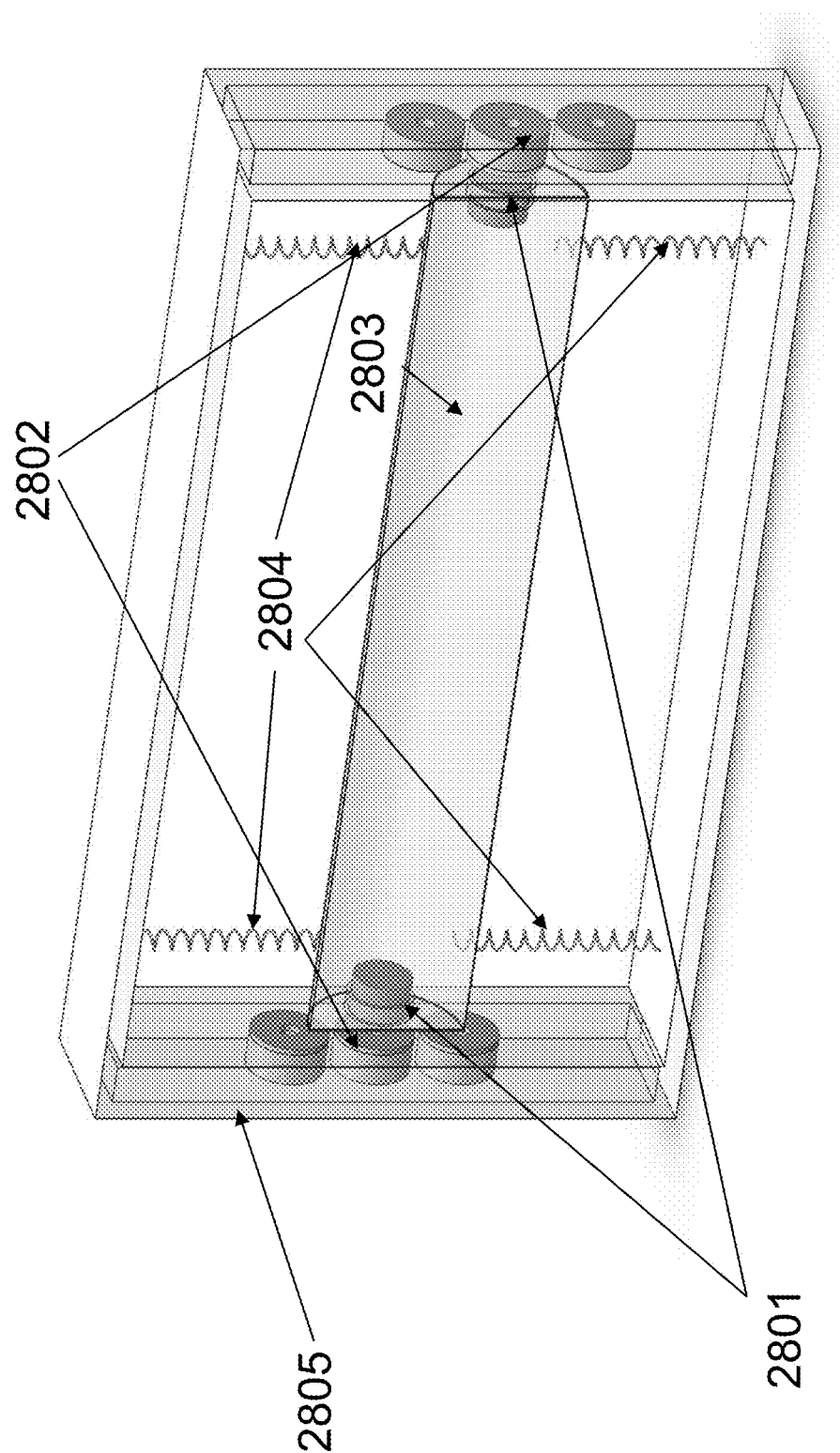

FIGS. 28A and 28B provide perspective views of a non-rotating wind energy generator according to an embodiment of the invention. In this embodiment, there are magnets 2801, coil of wire 2802, a beam 2803, springs 2804, and a frame 2805. In this embodiment multiple coils of wire 2802 are attached to stationary members of the frame 2806. The coils of wire 2802 can be located with their flat face perpendicular to the front face of the beam. In this embodiment, the permanent magnets 2801 are mounted to beam 2803. The magnet 2801 is positioned close to the flat face of the coils of wire 2802 such that the magnetic field lines periodically pass through each of the coils of wire 2802 as the beam oscillates. In this embodiment, lateral beam motion perpendicular to the flat face of the beam 2803 can avoid causing frictional contact with any surface. Alternatively, in this embodiment, lateral beam motion perpendicular to the flat face of the beam 2803 can reduce frictional contact with a surface.

Figure 29A:
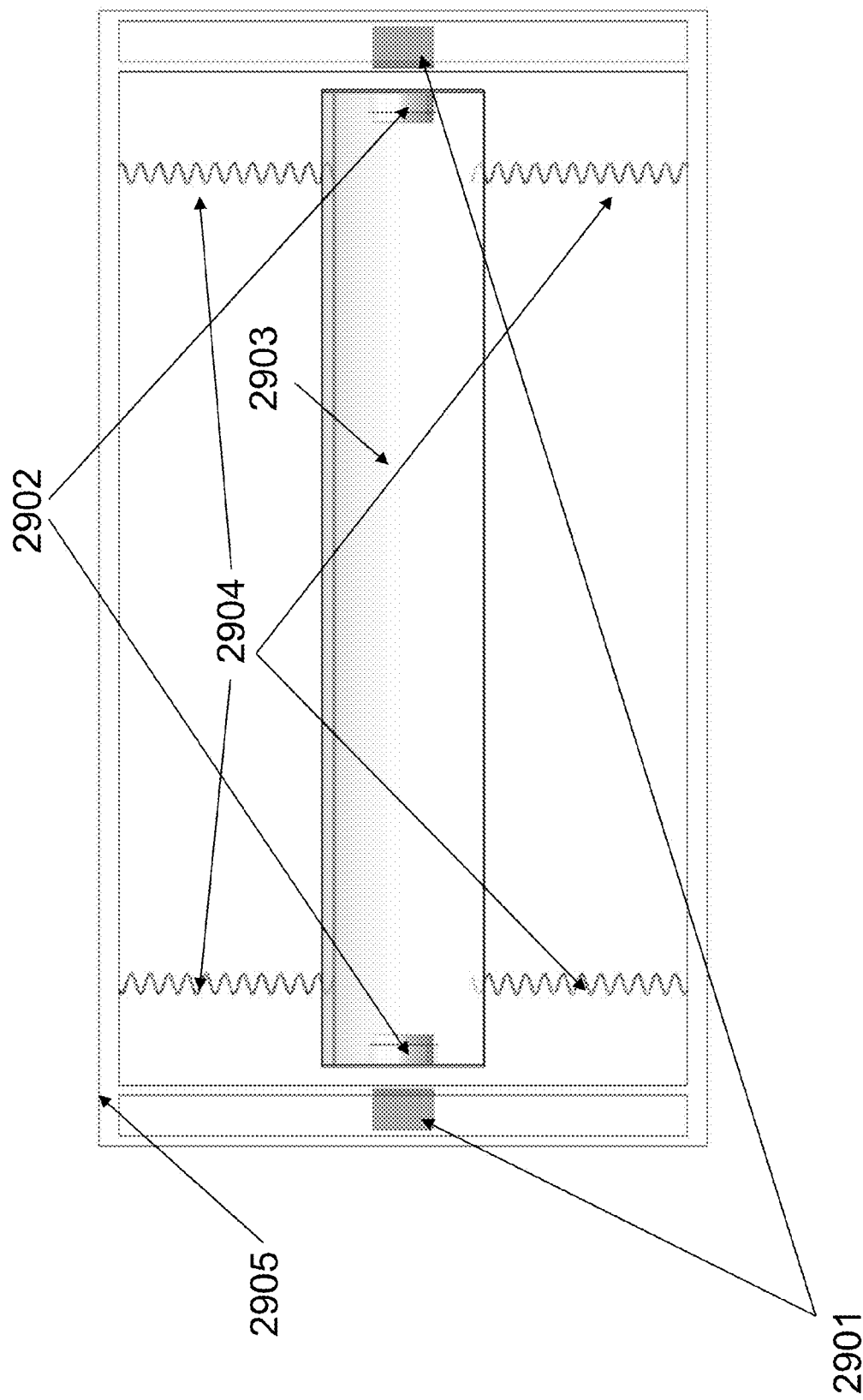
FIGS. 29A and 29B provide perspective views of a non-rotating wind energy generator according to an embodiment of the invention.
Figure 29B:
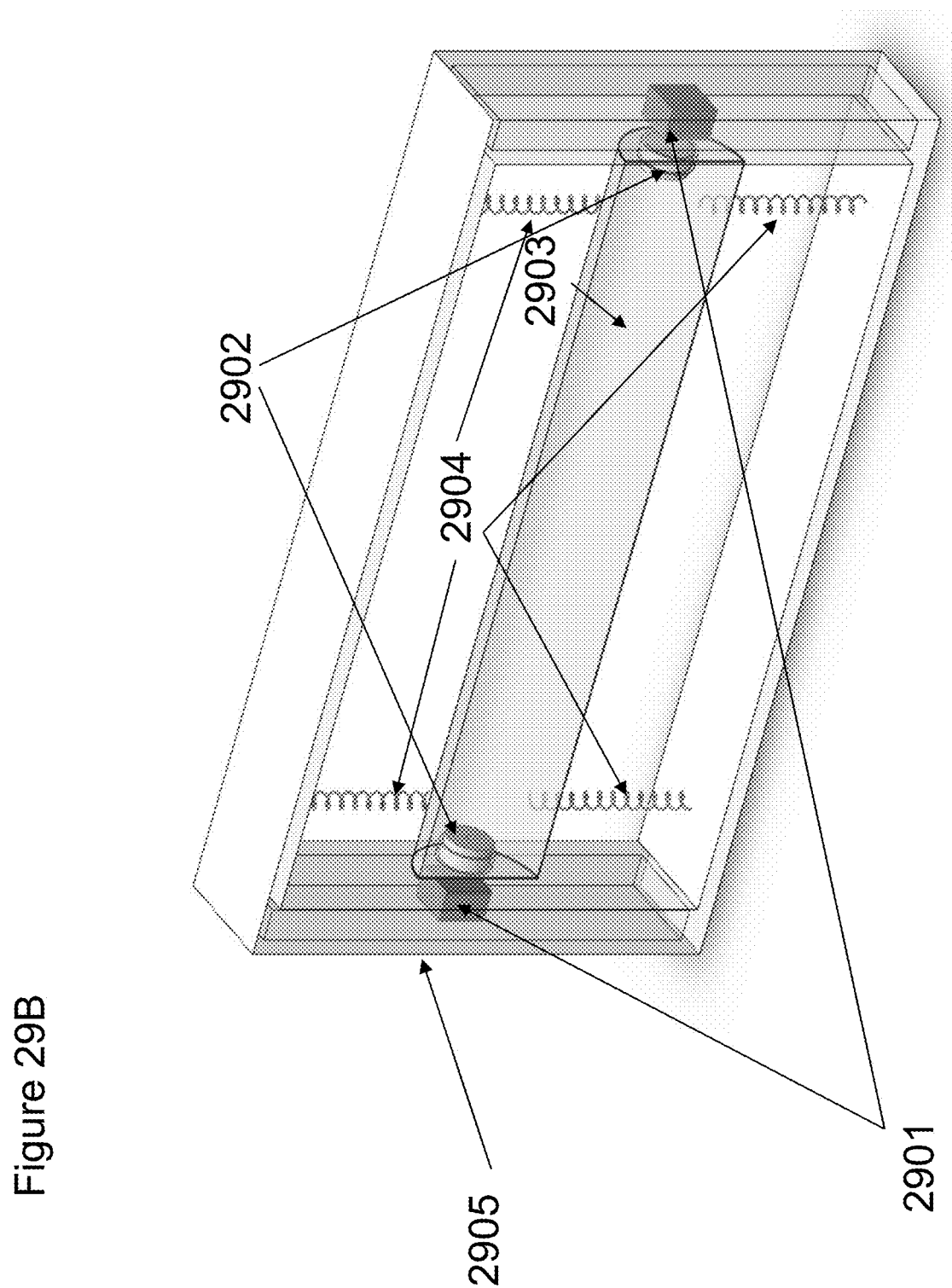

FIGS. 29A and 29B provide perspective views of a non-rotating wind energy generator according to an embodiment of the invention. In this embodiment, there are magnets 2901, coils of wire 2902, a beam 2903, springs 2904, and a frame 2905. In this embodiment the permanent magnets 2901 are attached to stationary members of the frame 2905. The permanent magnets 2901 can be located with their flat face perpendicular to the front face of the beam 2903. In this embodiment, the coils of wire 2902 are mounted to beam 2903. In this embodiment, the magnet 2901 is positioned close to the flat face of the coil of wire 2902 such that the magnetic field lines periodically pass through the coils of wire 2902 as the beam 2902 oscillates. In this embodiment, lateral beam motion perpendicular to the flat face of the beam 2903 can avoid causing frictional contact with any surface. Alternatively, in this embodiment, lateral beam motion perpendicular to the flat face of the beam 2903 can reduce frictional contact with a surface.

Figure 30A:
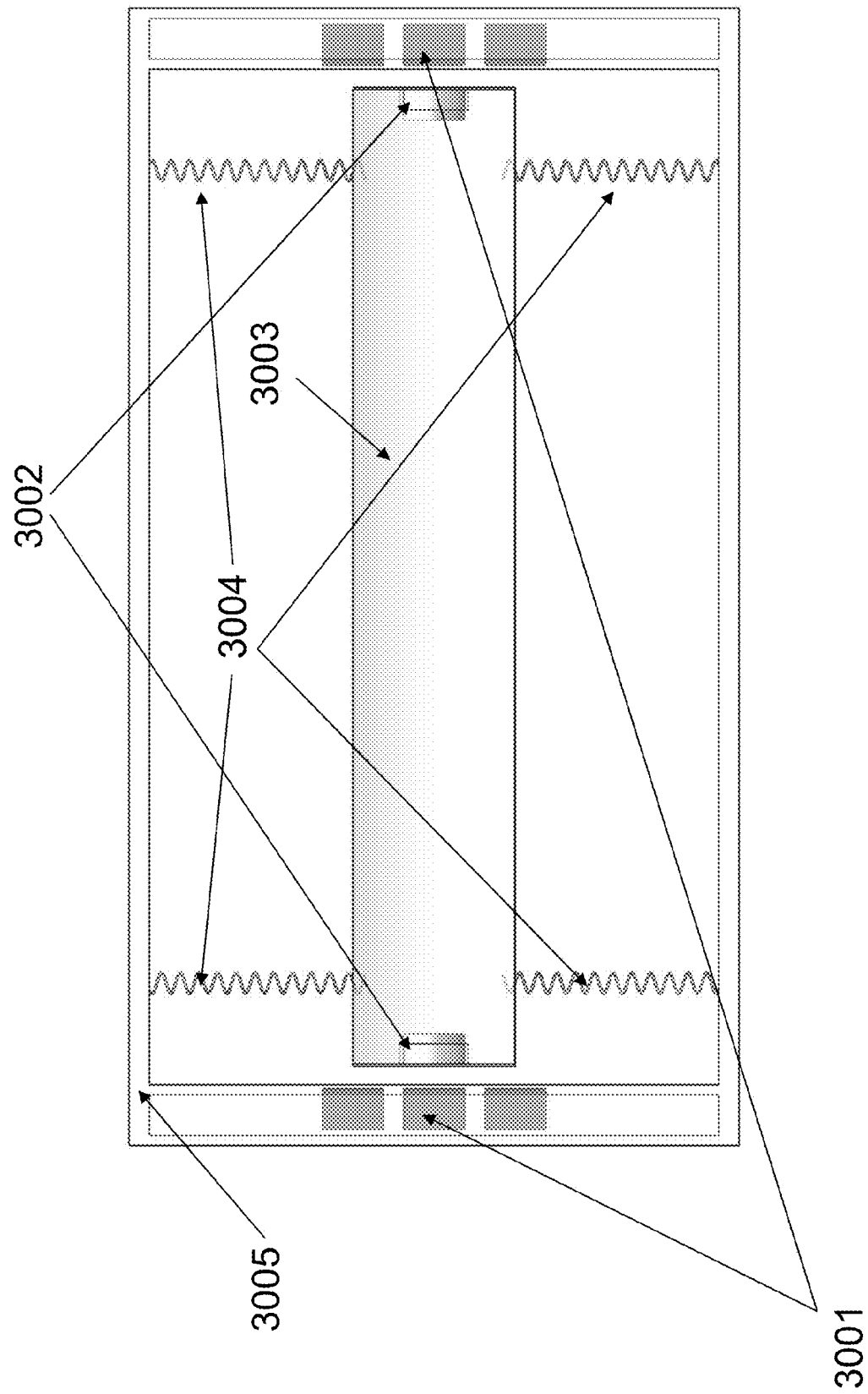
FIGS. 30A and 30B provide perspective views of a non-rotating wind energy generator according to an embodiment of the invention.
Figure 30B:
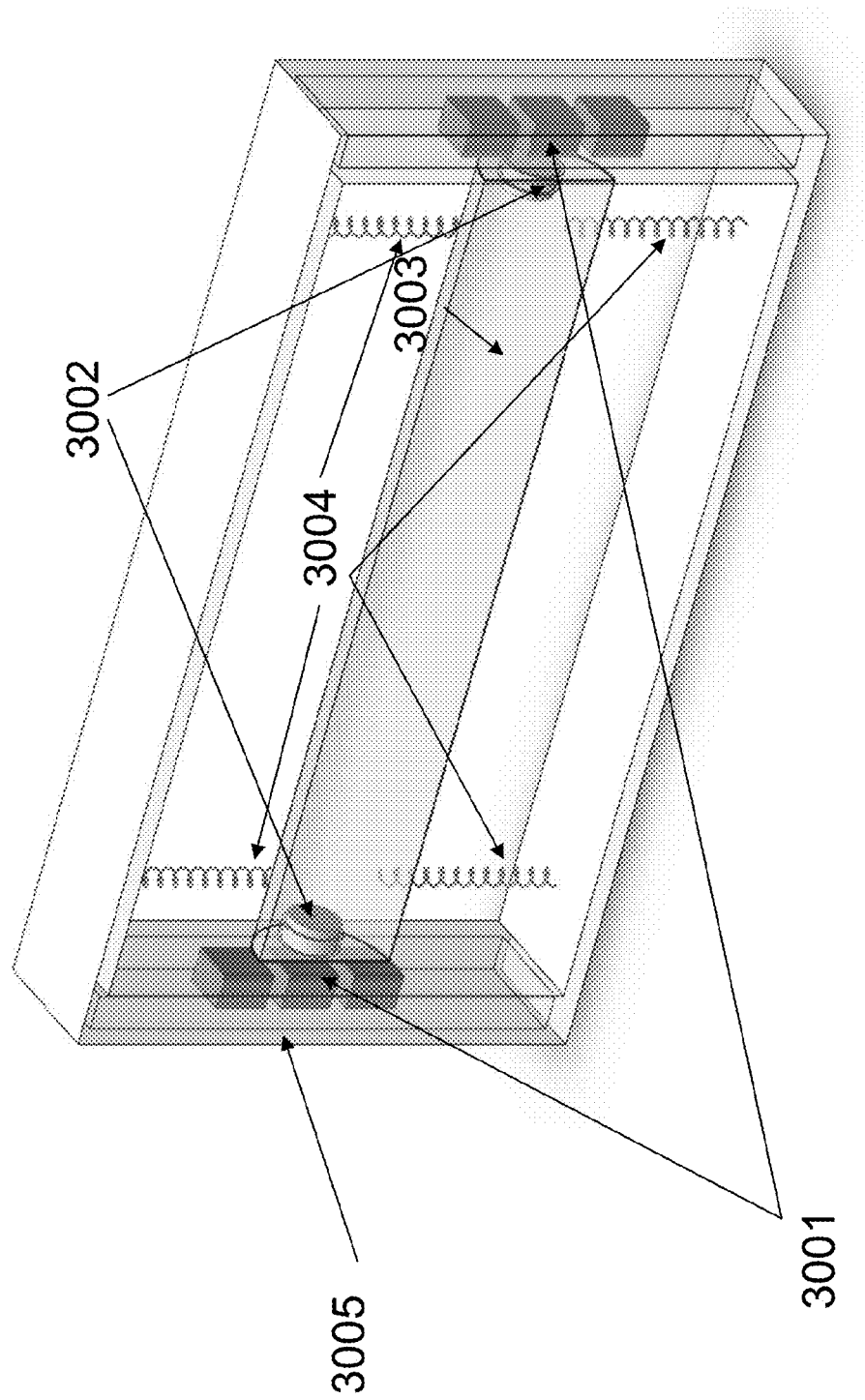

FIGS. 30A and 30B provide perspectives view of a non-rotating wind energy generator according to an embodiment of the invention. In this embodiment, there are magnets 3001, coils of wire 3002, a beam 3003, springs 3004, and a frame 3005. In this embodiment multiple permanent magnets 3001 are attached to stationary members of the frame 3005. The permanent magnets 3001 can be located with their flat face perpendicular to the front face of the beam 3003. In this embodiment, the coils of wire 3002 are mounted to beam 3003. The magnets 3001 are positioned close to the flat face of the coil of wire 3002 such that the magnetic field lines periodically pass through the coils of wire 3002 as the beam 3003 oscillates. In one embodiment the stacked magnets have the same relative polarity (e.g., N-N-N or S-S-S). In another embodiment the stacked magnets have reversing relative polarities (e.g., N-S-N or S-N-S). In this embodiment, lateral beam motion perpendicular to the flat face of the beam 3003 can avoid causing frictional contact with any surface. Alternatively, in this embodiment, lateral beam motion perpendicular to the flat face of the beam 3003 can reduce frictional contact with a surface.

In a further aspect of the invention, electricity is transmitted from a generation source located onboard a moving bluff body (e.g., a beam) to a terminal statically located elsewhere on a non-rotating wind energy generator (NRWEG). In certain embodiments of the invention, the embodiment may advantageously permit the transmission of electricity from the generation source located on a moving bluff body (e.g., a beam) to a static terminal location without the need for additional wire leads or points of contact. In certain embodiments of the invention, the springs used to suspend the bluff body (e.g., a beam) may advantageously act as wire leads that conduct electricity from the electromagnetic coils that are mounted onboard the moving bluff body (e.g., beam).

By using springs as leads for electricity transmission, the need for additional wires or points of contact can be reduced or eliminated. This can reduce the drag force on a beam due to mechanical friction from rubbing contact or periodic flexing of separate wire leads. The use of spring wire leads can also be more cost effective, reliable, and less susceptible to failure.

Aspects of the invention related to electricity transmission have significant economic potential when paired with aspects of the invention related to non-rotating wind energy generator systems. For most or all commercial applications of embodiments of non-rotating wind energy generator systems, aspects of the invention related to electricity transmission could be used for efficient operation/power generation.

In an embodiment of the non-rotating wind energy generator (NRWEG) apparatus, electromagnetic coils are mounted to a bluff body (e.g., a beam) that is suspended by springs. In this embodiment, during operation, airflow passes over the bluff body and causes it to oscillate rapidly. As the bluff body oscillates in this embodiment, the electromagnetic coils pass through magnetic fields formed by permanent magnets statically mounted to the NRWEG frame. When this occurs, electricity can be generated in the electromagnetic coils. To effectively use this electricity, it can be transmitted from the electromagnetic coils to a statically mounted terminal location. An effective method for electricity transmission can include using the springs as electrical leads. To do this, each of the two wire leads from the electromagnetic coil can be connected (e.g., via solder, clip, screw, etc.) to one of the springs that is used to suspend the bluff body. The other end of the spring can be mounted to some portion (e.g., the top and bottom horizontal members) of an NRWEG frame. A separate wire lead can be connected to each of the springs (at the location of contact between the spring and frame) to continue the transmission of electricity from the springs to the preferred point of use (e.g., terminal box, power conditioning circuitry, etc.).

Figure 31A:
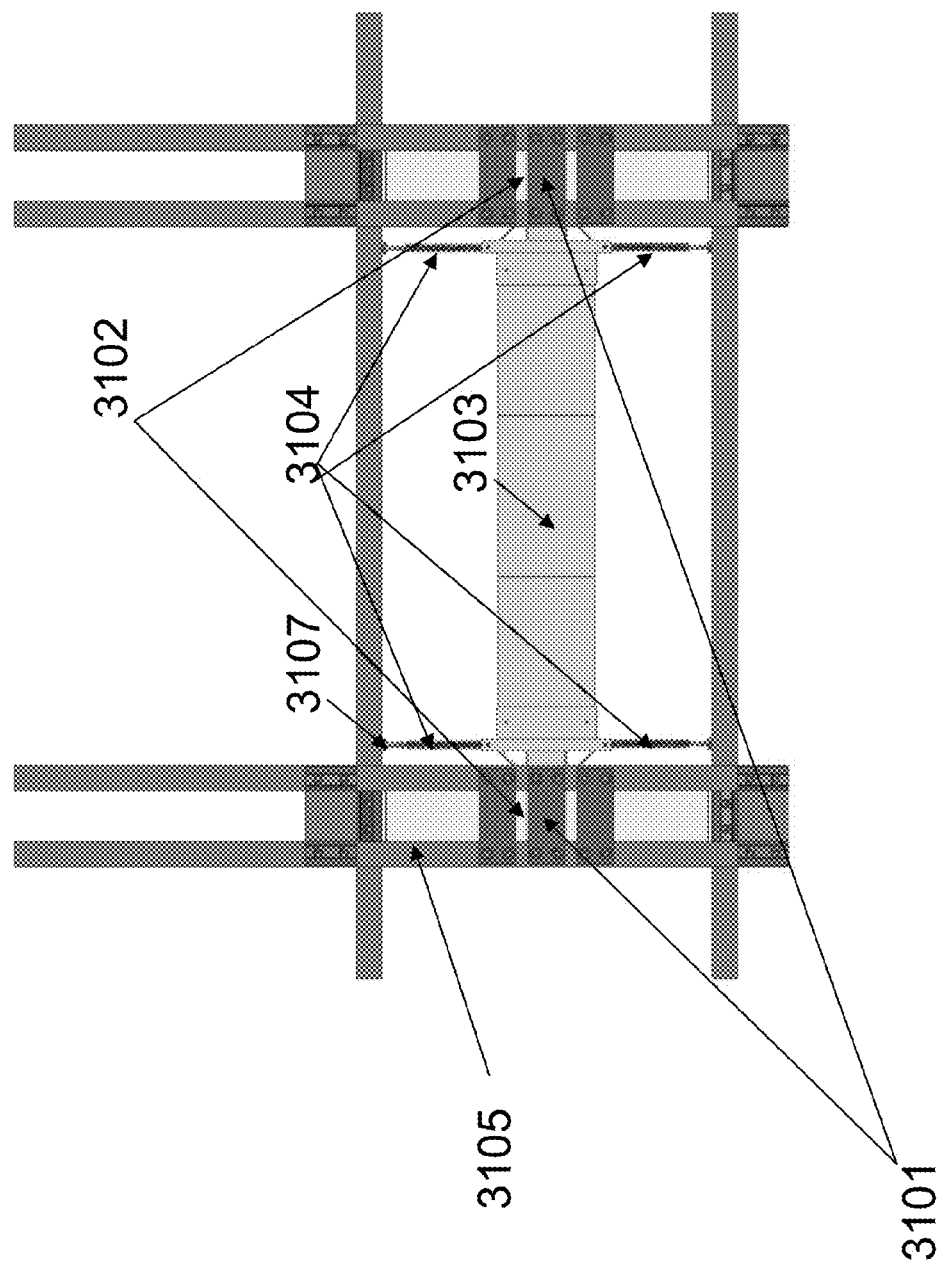
FIGS. 31A, 31B, and 31C show electricity transmission according to an embodiment of the invention.
Figure 31B:
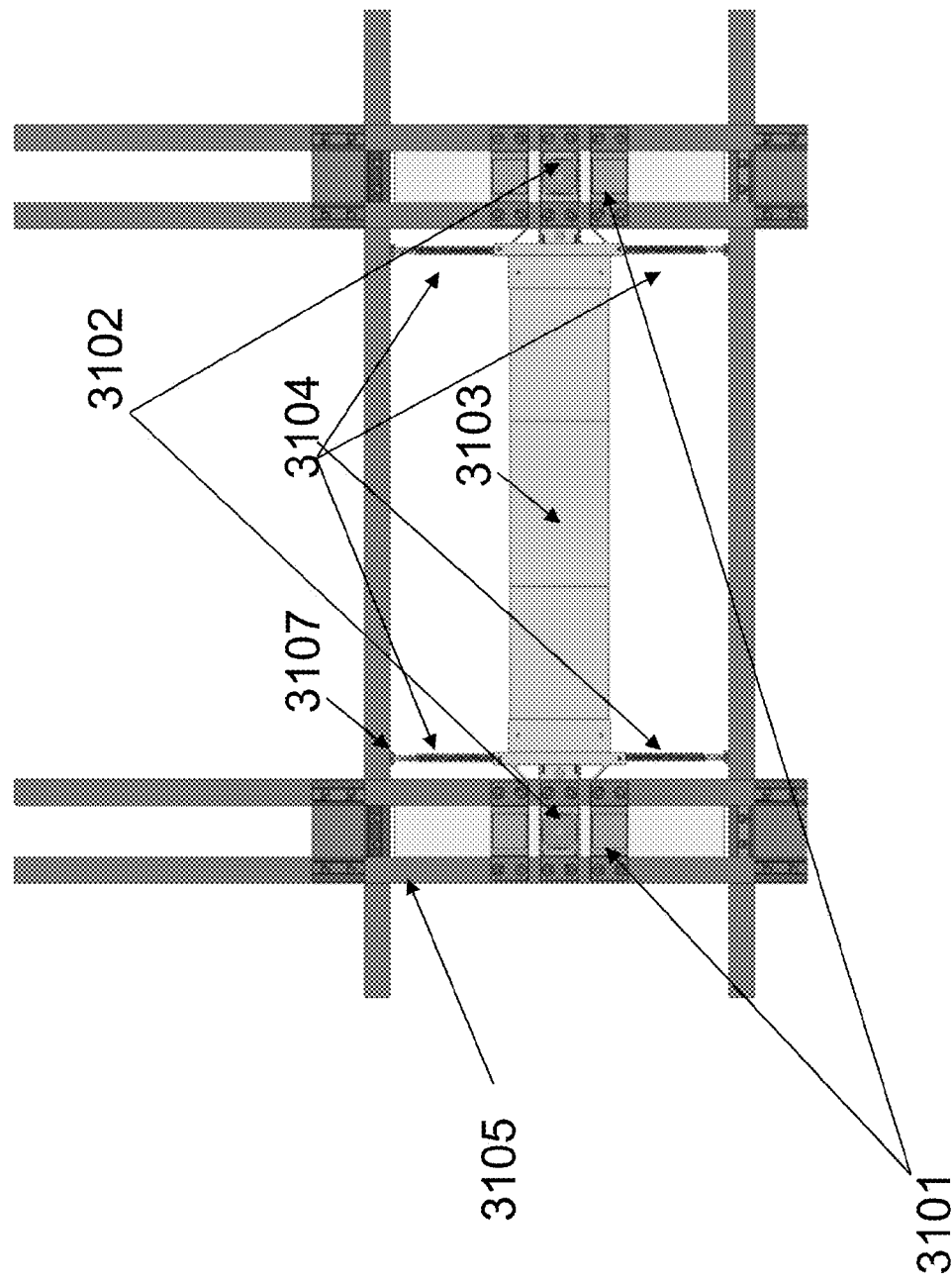
Figure 31C:
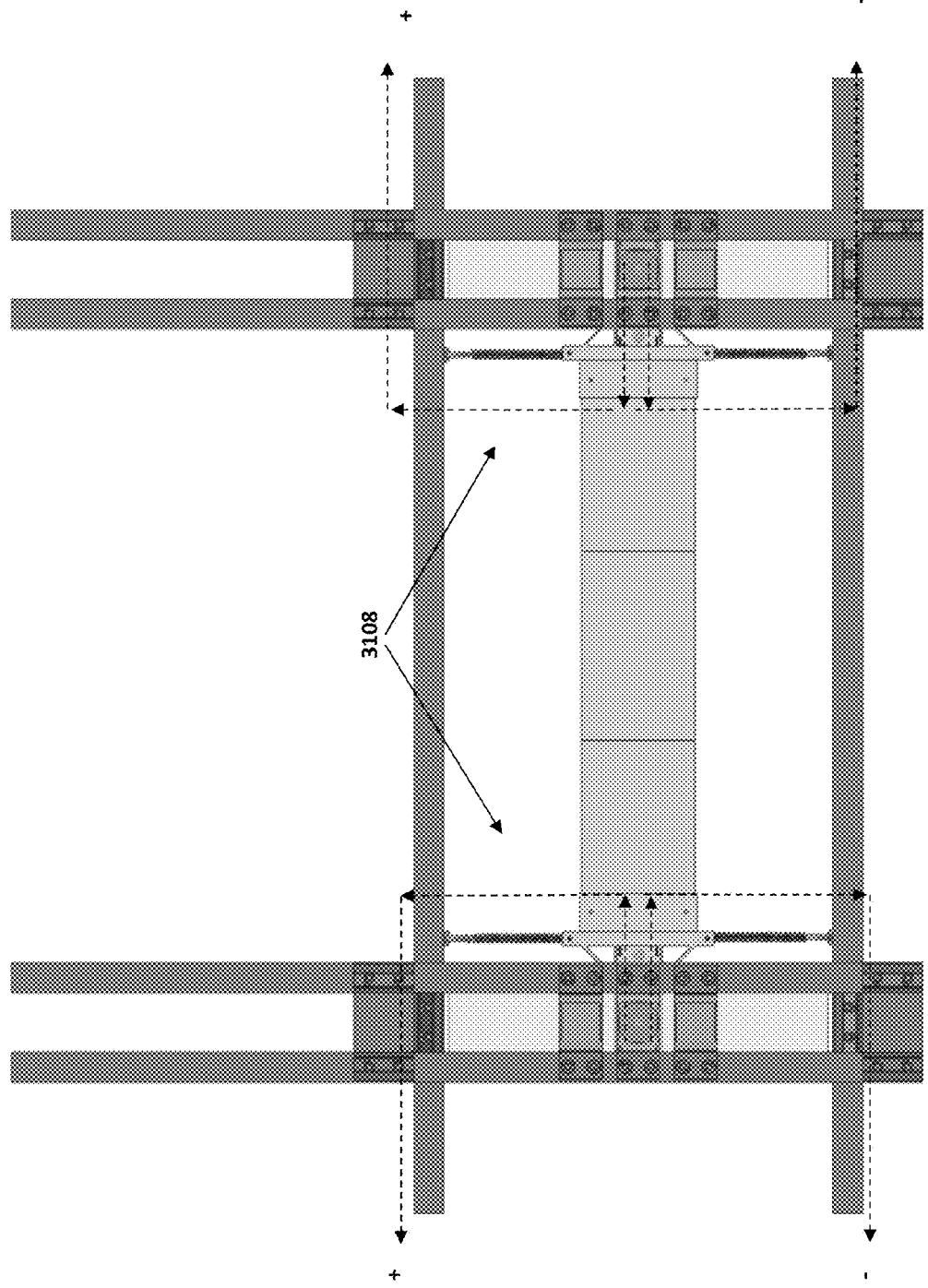

FIGS. 31A, 31B, and 31C show electricity transmission according to an embodiment of the invention where a method for electricity transmission can include using each of the two wire leads from each of the electromagnetic coils connected to a spring for electricity transmission, and further using separate wire leads connected to each of the springs at the location of contact between the springs and the frame to continue the transmission of electricity from the springs to a preferred point of use. In this embodiment, there are magnets 3101, electromagnetic coils 3102, a beam 3103, springs 3104, and a frame 3105. In this embodiment, electromagnetic coils 3102 are mounted to beam 3103 that is suspended by springs 3104. In this embodiment, the beam 3103 and the frame 3105 each have four connection points 3107. In this embodiment, there are multiple pairs of magnets 3101 that are stacked on top of each other. As the beam 3103 carrying the coil 3102 travels up and down, the coil 3102 pass through several magnetic fields generated by the parallel magnets 3101. In embodiments of the invention, the polarity of the stacked magnets 3101 can be switched (e.g., North, South, North, etc.). In further embodiments of the invention, the polarity of the stacked magnets 3101 is not switched. Further embodiments of the invention can also include a combination of stacked magnets 3101 where the polarity is switched and stacked magnets 3101 that are not switched. In at least one embodiment of the invention, utilizing stacked magnets 3101 where the polarity is switched can improve power output. In FIG. 31A, the magnets 3101 are depicted as opaque, whereas in FIG. 31B, the magnets 3101 are depicted transparently so that the coil 3102 can be seen. In this embodiment, during operation, airflow can pass over beam 3103 and causes it to oscillate rapidly. As the beam 3103 oscillates in this embodiment, the electromagnetic coils 3102 pass through magnetic fields formed by magnets 3101 statically mounted to the frame 3105. When this occurs, electricity can be generated in the electromagnetic coils 3102. To effectively use this electricity, it can be transmitted from the electromagnetic coils 3102 to a statically mounted terminal location (not shown), along electricity transmission paths 3108, as illustrated in FIG. 31C. In FIG. 31C, the positive and negative terminals of the terminal location (not shown) are represented with "+" and "−," respectively. A method for electricity transmission according to this embodiment can include using the springs 3104 as electrical leads. To do this, each of the two wire leads from each of the electromagnetic coils 3102 can be connected (e.g., via solder, clip, screw, etc.) to one of a spring 3104 that is used to suspend the beam 3103. The other end of the spring 3104 can be mounted to some portion (e.g., the top and bottom horizontal members) of the frame 3105. A separate wire lead can be connected to each of the springs 3104 at the location of contact between the spring 3104 and frame 3105 to continue the transmission of electricity from the springs 3104 to the preferred point of use (e.g., terminal box, power conditioning circuitry, etc.).

What is claimed is:

1. A non-rotating wind energy generating apparatus, comprising:
    a bluff body operable to initiate and sustain non-rotational oscillatory motion in response to wind energy; and
    an alternator system operable to generate electrical energy via the motion of the bluff body.

2. The non-rotating wind energy generating apparatus of claim 1, wherein the bluff body comprises:
    a frame movably supporting at least one beam;
    one or more first springs;
    one or more second springs;
    wherein the one or more first springs attach a first portion of the frame to a first portion of the beam and the one or more second springs attach a second portion of the frame to a second portion of the beam such that the beam is suspended between the first and second portions of the frame; and
    wherein the alternator system comprises at least one electromagnetic coil attached to one of the beam or a third portion of the frame;
    at least one magnet attached to one of the third portion of the frame or the beam;
    wherein motion of the beam when exposed to wind causes the first electromagnetic coil to pass at least one magnet.

3. The non-rotating wind energy generating apparatus of claim 2, wherein the beam has a D-shape.

4. The non-rotating wind energy generating apparatus of claim 2, wherein the beam is hollow.

5. The non-rotating wind energy generating apparatus of claim 2, further comprising one or more motion guides.

6. The non-rotating wind energy generating apparatus of claim 2, further comprising:
    one or more additional beams;
    one or more additional upper springs;
    one or more additional lower springs;
    wherein the one or more additional upper springs attach a first portion of the additional beam to a third portion of the beam and the one or more additional lower springs attach a second portion of the additional beam to a fourth portion of the beam such that the one or more additional beams are suspended between the first and second portions of the frame.

7. The non-rotating wind energy generating apparatus of claim 2, wherein the first portion of the frame is an upper portion, the first portion of the beam is an upper portion, the second portion of the frame is a lower portion, and the second portion of the beam is a lower portion.

8. The non-rotating wind energy generating apparatus of claim 2, wherein the third portion of the frame is a side portion.

9. The non-rotating wind energy generating apparatus of claim 2, wherein the beam is suspended substantially horizontally.

10. The non-rotating wind energy generating apparatus of claim 2, wherein the motion of the beam is substantially vertical.

11. The non-rotating wind energy generating apparatus of claim 2, wherein a surface of the beam is uniformly smooth.

12. The non-rotating wind energy generating apparatus of claim 2, wherein a surface of the beam is partially smooth.

13. The non-rotating wind energy generating apparatus of claim 2, wherein a surface of the beam is uniformly rough.

14. The non-rotating wind energy generating apparatus of claim 2, wherein a surface of the beam is partially rough.

15. The non-rotating wind energy generating apparatus of claim 2, wherein the at least one electromagnetic coil or the at least one magnet is attached to a first end of the beam.

16. The non-rotating wind energy generating apparatus of claim 2, wherein the spring mass is selected to promote self-oscillatory motion.

17. The non-rotating wind energy generating apparatus of claim 2, wherein the beam has a cross-sectional geometry selected from the group consisting of a square, a cylinder, a reversed D-Beam (where the wind is primarily incident on the round portion of the beam rather than the flat portion), and an equilateral wedge in either a "greater than" or "less than" orientation relative to the incident wind.

18. The non-rotating wind energy generating apparatus of claim 2, wherein the springs are stretched in a resting state.

19. The non-rotating wind energy generating apparatus of claim 2, wherein the beam mass is selected to promote self-oscillatory motion.

20. A method of generating electrical energy from wind energy comprising:
    exposing the non-rotating wind energy generating apparatus of claim 1 to wind to generate oscillatory motion in response to wind energy; and
    generating electrical energy via motion of the non-rotating wind energy generating apparatus using electromagnetic induction.

21. The non-rotating wind energy generating apparatus of claim 1, wherein the alternator system comprises:
    at least one electromagnetic coil;
    at least one magnet;
    wherein motion of the bluff body when exposed to wind causes the first electromagnetic coil to pass the at least one magnet.

22. The non-rotating wind energy generating apparatus of claim 21, wherein the at least one magnet is stationary and the at least one electromagnetic coil is moveable.

23. The non-rotating wind energy generating apparatus of claim 21, wherein the at least one magnet is moveable and the at least one electromagnetic coil is stationary.

24. The non-rotating wind energy generating apparatus of claim 1, wherein the bluff body is configured to oscillate based on at least one of vortex shedding and transverse galloping.

25. The non-rotating wind energy generating apparatus of claim 1, further comprising at least one stop configured to limit a range of motion of the bluff body.

26. The non-rotating wind energy generating apparatus of claim 1, wherein the bluff body comprises:
    a frame movably supporting at least one beam;
    one or more springs;

wherein the one or more springs attach a portion of the frame to a portion of the beam; and wherein the one or more springs are configured to transmit energy.

27. The non-rotating wind energy generating apparatus of claim 26, wherein the alternator system comprises at least one electromagnetic coil attached to the beam or the frame; and wherein the at least one electromagnetic coil attaches to the one or more springs at a first end of the one or more springs and the one or more springs attach to the other of the frame or the beam at a second end of the one or more springs such that the one or more springs transmit energy between the beam and the frame.

28. A method of generating electrical energy comprising:

exposing a bluff body to wind to generate oscillatory motion in response to wind energy using at least one of vortex shedding and transverse galloping; and generating electrical energy via motion of the bluff body.

29. The method of claim 28, comprising exposing the bluff body to wind to generate oscillatory motion in response to wind energy using vortex shedding and transverse galloping.

* * * * *